US012774658B2

(12) United States Patent
Webster et al.

(10) Patent No.: US 12,774,658 B2
(45) Date of Patent: Oct. 27, 2026

(54) TURBINE ENGINE COMPONENT WITH A COOLING APERTURE

(71) Applicant: GENERAL ELECTRIC COMPANY, Evendale, OH (US)

(72) Inventors: Zachary Daniel Webster, Liberty Township, OH (US); Ricardo Caraballo, Maineville, OH (US); Matthew Lee Krumanaker, Blue Ash, OH (US); Jorge Rodrigo Quintero Badillo, Loveland, OH (US); Daniel Endecott Osgood, Loveland, OH (US); Michal Osusky, Rexford, NY (US); Logan Conner Sharp, Cincinnati, OH (US); Evin Nathaniel Barber, Ogden, UT (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/176,540

(22) Filed: Apr. 11, 2025

(65) Prior Publication Data

US 2026/0318211 A1 Oct. 15, 2026

(51) Int. Cl.
*F01D 5/18* (2006.01)

(52) U.S. Cl.
CPC ........ *F01D 5/187* (2013.01); *F05D 2260/201* (2013.01); *F05D 2260/22141* (2013.01)

(58) Field of Classification Search
CPC ........................... F01D 5/187; F05D 2260/201
See application file for complete search history.

(56) References Cited

U.S. PATENT DOCUMENTS

| | | | |
|---|---|---|---|
| 5,660,523 | A | 8/1997 | Lee |
| 6,254,334 | B1 | 7/2001 | LaFleur |
| 6,402,470 | B1 | 6/2002 | Kvasnak et al. |
| 6,991,430 | B2 | 1/2006 | Stec et al. |
| 7,645,123 | B1 | 1/2010 | Liang |
| 8,043,060 | B1 | 10/2011 | Liang |
| 8,057,181 | B1 | 11/2011 | Liang |
| 8,075,268 | B1 | 12/2011 | Liang |
| 8,444,376 | B2 | 5/2013 | Krueckels et al. |
| 8,529,193 | B2 | 9/2013 | Venkataramanan et al. |

(Continued)

FOREIGN PATENT DOCUMENTS

EP 2468433 B1 2/2020

OTHER PUBLICATIONS

European Patent Office, "Extended European Search Report," issued in connection with European Patent Application No. 26171961.1, dated Sep. 9, 2026, 11 pages.

*Primary Examiner* — Michael L Sehn
(74) *Attorney, Agent, or Firm* — Hanley, Flight & Zimmerman, LLC

(57) ABSTRACT

An airfoil for a gas turbine engine can include a cooling aperture for local thermal heat management and to provide a cooling film along an exterior of the airfoil. The cooling aperture is positioned within an outer wall defining an interior for the airfoil and a cooling circuit provides a cooling fluid flow to the cooling aperture. The cooling aperture includes a cavity at least partially defined by an impingement portion, a bend, and a diffusion portion that is arranged at an angle relative to the impingement portion. A pin is provided within the cooling aperture.

16 Claims, 21 Drawing Sheets

(56) References Cited

U.S. PATENT DOCUMENTS

| | | | | |
|---|---|---|---|---|
| 8,613,597 | B1 | 12/2013 | Liang | |
| 8,814,500 | B1 | 8/2014 | Liang | |
| 8,944,141 | B2 | 2/2015 | Propheter-Hinckley et al. | |
| 9,017,026 | B2 | 4/2015 | Bergholz, Jr. et al. | |
| 9,109,454 | B2 | 8/2015 | Ellis et al. | |
| 9,145,773 | B2 | 9/2015 | Bergholz, Jr. et al. | |
| 9,366,143 | B2 | 6/2016 | Lee et al. | |
| 9,376,920 | B2 | 6/2016 | McBrien et al. | |
| 9,995,145 | B2 | 6/2018 | Propheter-Hinckley et al. | |
| 10,260,354 | B2 | 4/2019 | Bunker | |
| 10,301,954 | B2 | 5/2019 | Allen et al. | |
| 10,422,230 | B2 | 9/2019 | Lewis et al. | |
| 10,519,778 | B2 | 12/2019 | Xu et al. | |
| 10,598,382 | B2 | 3/2020 | Tu et al. | |
| 10,968,750 | B2 | 4/2021 | Webster et al. | |
| 11,008,873 | B2 * | 5/2021 | Banks | F01D 5/187 |
| 11,021,965 | B2 | 6/2021 | Crites et al. | |
| 11,286,791 | B2 | 3/2022 | Crites et al. | |
| 11,377,963 | B2 | 7/2022 | Webster et al. | |
| 11,486,259 | B1 * | 11/2022 | Osgood | F01D 5/187 |
| 11,519,277 | B2 | 12/2022 | Osgood et al. | |
| 11,655,716 | B2 | 5/2023 | Lee et al. | |
| 11,732,590 | B2 | 8/2023 | Craig et al. | |
| 2008/0003096 | A1 | 1/2008 | Kohli et al. | |
| 2015/0184518 | A1 | 7/2015 | Lee | |
| 2016/0305254 | A1 | 10/2016 | Snyder et al. | |
| 2018/0258772 | A1 | 9/2018 | Propheter-Hinckley et al. | |
| 2021/0239005 | A1 | 8/2021 | Webster et al. | |

* cited by examiner

TURBINE ENGINE COMPONENT WITH A COOLING APERTURE

TECHNICAL FIELD

The present subject matter relates generally to a turbine engine component, such as an airfoil, having a cooling aperture for cooling the turbine engine component.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
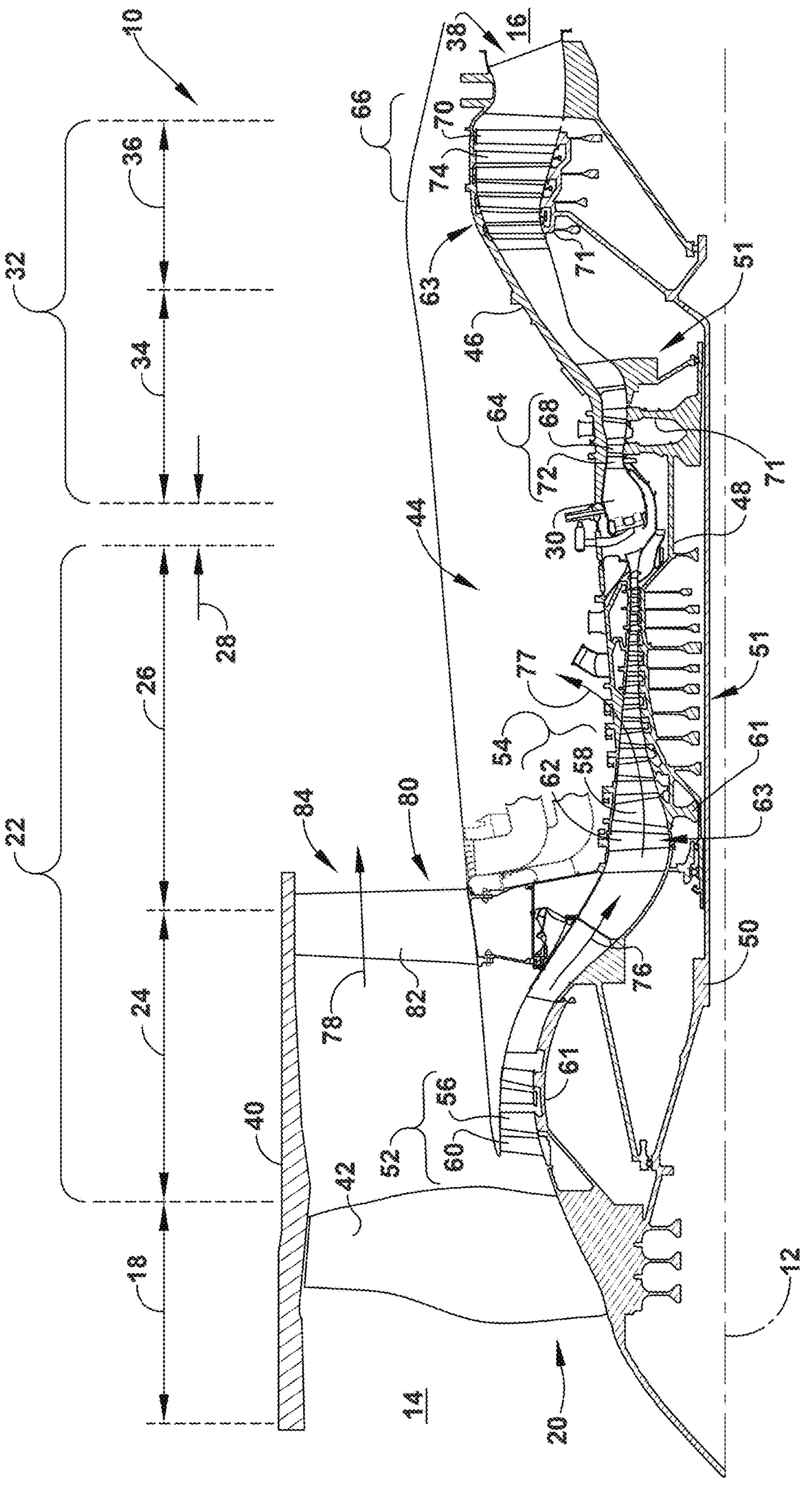
FIG. 1 is a schematic cross-sectional view of a gas turbine engine, in accordance with an aspect of the present disclosure.

During operation of the gas turbine engine various systems may generate a relatively large amount of heat. For example, a substantial amount of heat may be generated during operation of the thrust generating systems, lubrication systems, electric motors and/or generators, hydraulic systems or other systems. Accordingly, a cooling aperture within the engine components located in the various systems would be advantageous in the art.

Aspects of the disclosure herein are directed to a cooling aperture located within an engine component, such as an airfoil, and more specifically to a cooling aperture where a performance of the cooling aperture is a function of geometry parameters that drive heat transfer, cooling film generation, and pressure drop resultant of a cooling fluid passed through the cooling aperture. Such a cooling aperture can be a cooling hole or a film hole, in non-limiting examples. For purposes of illustration, the present disclosure will be described with respect to the cooling aperture located within an airfoil of a turbine for a gas turbine engine, such as a turbine blade provided within a turbine section of the gas turbine engine. It will be understood, however, that aspects of the disclosure herein are not so limited and may have general applicability within an engine, including compressors or fans, as well as in non-aircraft applications or other turbine environments, such as other mobile applications and non-mobile industrial, commercial, and residential applications. It should be further understood that the cooling aperture is not limited to only an airfoil implementation, and can be utilized in any component utilizing cooling, such as an airfoil, a blade, a vane, a nozzle, a combustor liner, or a shroud in non-limiting examples.

Reference will now be made in detail to the architecture, and in particular the cooling aperture, located within a turbine blade, one or more examples of which are illustrated in the accompanying drawings. The detailed description uses numerical and letter designations to refer to features in the drawings.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, the ranges disclosed herein can be inclusive or exclusive of the endpoints, and the endpoints may be independently combinable with one other.

A "hydraulic diameter" ($d_h$), as used herein, is in reference to a hydraulic diameter of at least one metering hole providing the cooling fluid flow to a cavity. Hydraulic diameter is a commonly used term when handling flow of fluids in flow passages where such flow passages may be circular or non-circular holes, tubes, apertures, channels, or conduits in non-limiting examples. The hydraulic diameter is defined as $$d_h = \frac{4a}{p}$$

where "a" is the cross-sectional area of the flow passage and "p" is the wetted perimeter of the cross-section. Where a cooling aperture utilizes more than one metering hole, the "hydraulic diameter" ($d_h$) as used herein can be an average of the hydraulic diameters among the more than one metering hole.

In certain exemplary embodiments of the present disclosure, a gas turbine engine defining a centerline and a circumferential direction is provided. The gas turbine engine may generally include a turbomachine and a rotor assembly. The rotor assembly may be driven by the turbomachine. The turbomachine, the rotor assembly, or both may define a substantially annular flow path relative to the centerline of the gas turbine engine. The gas turbine engine includes an airfoil, by way of non-limiting example a turbine blade positioned within the flow path, with at least one cooling aperture provided within. The airfoil described herein can be among a plurality of airfoils provided circumferentially about the centerline or be partially provided about a portion of the centerline.

The at least one cooling aperture design for the airfoil can be designed for various flight conditions, including take off, descent, and idle. The objective, when designing an airfoil, can be generally stated as satisfying a minimum heat transfer capability or minimum cooling film capability within an acceptable amount of pressure across the airfoil. Key factors to consider include the available fluid volume and associated geometrical constraints for the at least one cooling aperture design and the operational limits of the engine component.

The inventor's practice has proceeded in the manner of designing an airfoil, modifying the airfoil with the addition of at least one cooling aperture, and redesigning the airfoil with the at least one cooling aperture to meet heat transfer, cooling film, and pressure requirements, then calculating and checking the amount of heat transfer, temperature, and pressure, and repeating the process, etc. during the design of several different types of turbomachines, such as those shown in FIG. 1.

FIG. 1 is a schematic cross-sectional diagram of a gas turbine engine 10 for an aircraft. The gas turbine engine 10 has a generally longitudinally extending axis or engine centerline 12 extending from a forward 14 to an aft 16 defining a forward direction and an aft direction, respectively. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The gas turbine engine 10, as illustrated, is a turbofan engine. It will be appreciated, however, that the gas turbine engine 10 can be any suitable engine such as, but not limited to, a turboprop engine, a turboshaft engine, a ducted turbofan engine, an unducted engine, or an open rotor turbine engine.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by a core casing 46, which can be coupled with the fan casing 40.

An HP shaft or spool 48 disposed coaxially about the engine centerline 12 of the gas turbine engine 10 and drivingly connects the HP turbine 34 to the HP compressor 26. An LP shaft or spool 50, which is disposed coaxially about the engine centerline 12 of the gas turbine engine 10 within the greater diameter of the HP spool 48, drivingly connects the LP turbine 36 to the LP compressor 24 and fan 20. The HP and LP spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a turbine rotor disk 71, which is mounted to the corresponding one of the HP and LP spools 48, 50, with each stage having a dedicated disk. The static turbine vanes 72, 74 for a stage of the compressor can be mounted to the core casing 46 in a circumferential arrangement.

Complementary to the rotor portion, the stationary portions of the gas turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24 as a pressurized air 76 or a bypass airflow 78. The pressurized air 76 passes to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24.

A portion of the pressurized air 76 can be drawn from the compressor section 22 as a bleed airflow 77. The bleed airflow 77 can be drawn from the pressurized air 76 and provided to engine components requiring cooling. The temperature of pressurized air 76 entering and exiting the combustor 30 is significantly increased. As such, cooling provided by the bleed airflow 77 is supplied to downstream turbine components (e.g., the turbine blade 68) subjected to the heightened temperature environments.

The bypass airflow 78 bypasses the LP compressor 24 and the engine core 44 and exits the gas turbine engine 10 through a stationary vane row. The stationary vane row can be an outlet guide vane assembly 80 comprising a plurality of airfoil guide vanes 82 at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the gas turbine engine 10, and/or used to cool or power other aspects of the aircraft. In the context of the gas turbine engine 10, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
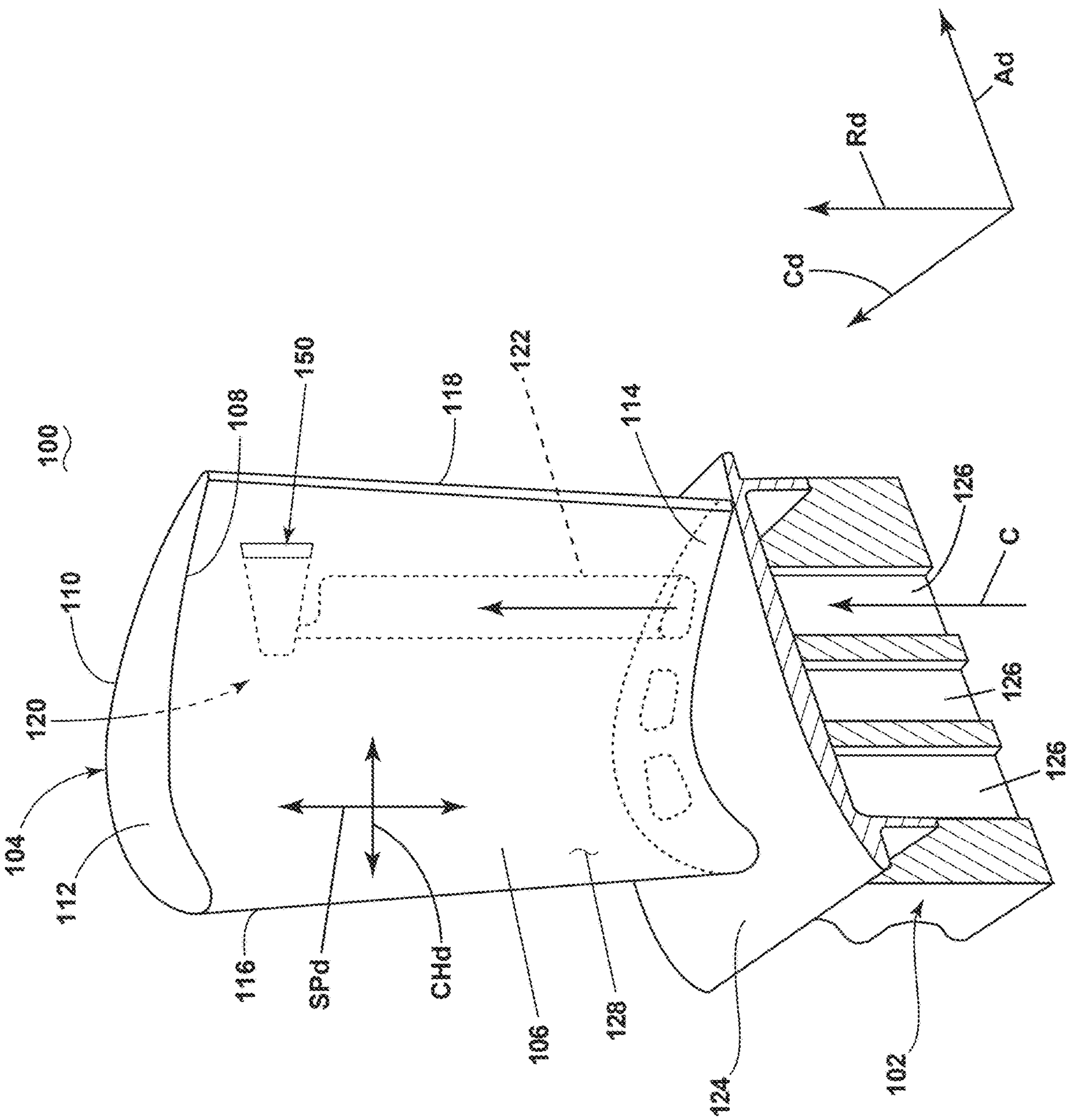
FIG. 2 is a partial section view of an engine component in the form of an airfoil with a cooling aperture, in accordance with an aspect of the present disclosure.

FIG. 2 is a partial section view of an engine component in the form of an airfoil or a turbine blade assembly 100 is provided which can be the turbine blade 68, 70 of the gas turbine engine 10 from FIG. 1, for example. Alternatively, the engine component can be an airfoil, blade, vane, a strut, a service tube, a shroud, or a combustion liner in non-limiting examples, or any other engine component that can require or utilize a cooling architecture.

The turbine blade assembly 100 includes a dovetail 102 and an airfoil 104. The airfoil 104 includes an outer wall 106 with a concave-shaped pressure side 108 and a convex-shaped suction side 110, which collectively define an airfoil cross-sectional shape. The airfoil 104 extends between a tip 112 and a root 114 to define a span-wise direction (SPd) extending therebetween and extends between a leading edge 116 and a trailing edge 118 to define a chord-wise direction (CHd) therebetween. An interior 120 of the airfoil 104 can include a cooling circuit 122, illustrated in broken line. While only a single cooling circuit 122 is illustrated, one or more cooling circuits are contemplated.

The airfoil 104 mounts to the dovetail 102 at a platform 124 at the root 114. When multiple airfoils are circumferentially arranged in side-by-side relationship, the platform 124 helps to radially contain the gas turbine engine mainstream airflow and forms the radially inner wall of an annulus through which the air flows. The dovetail 102 can be configured to mount to the turbine rotor disk 71 (FIG. 1), in a non-limiting example. The dovetail 102 is oriented to mount to the turbine rotor disk 71 along an axial direction (Ad), while other attachment directions or methods are contemplated. The dovetail 102 further includes at least one inlet passage, shown as three exemplary inlet passages 126, extending through the dovetail 102 to provide internal fluid communication with the airfoil 104. The cooling circuit 122 can be fluidly coupled with one inlet passage 126 to provide a cooling fluid flow (C) to the interior 120.

A cooling aperture 150 is provided on the outer wall 106 and can be located along any portion of the outer wall 106. The cooling fluid flow (C) can be supplied from the cooling circuit 122 to the cooling aperture 150, where the cooling fluid flow (C) can exhaust from the cooling aperture 150, spreading along an exterior surface 128 of the outer wall 106, such as exhausting as a cooling film in a non-limiting example.

In a non-limiting example, the cooling aperture 150 can pass through a substrate, which can be the outer wall 106 for example, as shown in FIG. 2. It should be understood, however, that the substrate can be any wall within the gas turbine engine 10 or the airfoil 104, including but not limited to interior walls, a tip wall, a shroud, the fan blade 42 (FIG. 1), a compressor blade 56, 58 or static compressor vane 60, 62 (FIG. 1), a turbine blade 68, 70 or static turbine vane 72, 74 (FIG. 1), or a combustion liner wall. In additional non-limiting examples, the cooling aperture 150 can be provided in a component, such as a turbine engine component like the airfoil 104.

For the sake of reference, a set of relative reference directions, along with a coordinate system can be applied to the turbine blade assembly 100. The axial direction (Ad) can extend parallel to the engine centerline 12 (FIG. 1). A radial direction (Rd) extends perpendicular to the axial direction (Ad) and can extend perpendicular to the engine centerline 12 (FIG. 1). In a non-limiting example, the span-wise direction (SPd) can be parallel to the radial direction (Rd), while an angular offset is contemplated. A circumferential direction (Cd) can be defined perpendicular to the radial direction (Rd) and can be defined along a circumference about the axial direction (Ad) or extending locally from and perpendicular to the radial direction (Rd) along a circumference about the engine centerline 12 (FIG. 1).

Materials used to form the airfoil 104 and the cooling aperture 150, as well as the turbine blade assembly 100 or portions thereof, can include, but are not limited to, steel, refractory metals such as titanium, or superalloys based on nickel, cobalt, or iron, and ceramic matrix composites. The substrate and cooling architecture can be formed by a variety of methods, including additive manufacturing, casting, electroforming, or direct metal laser melting, in non-limiting examples. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD model is produced, the AM equipment can read in data from the CAD file and lay down or add successive layers of liquid, powder, sheet material or other material, in a layer-upon-layer fashion to fabricate a 3D object representative of the CAD model. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component. In a non-limiting example, the airfoil 104 with the cooling aperture 150 can be formed with a ceramic core and then casting the airfoil 104 about the ceramic core. In another non-limiting example, the airfoil 104 with the cooling aperture 150 can be formed with a refractory metal core, and then casting the airfoil 104 about the refractory metal core.

Figure 3:
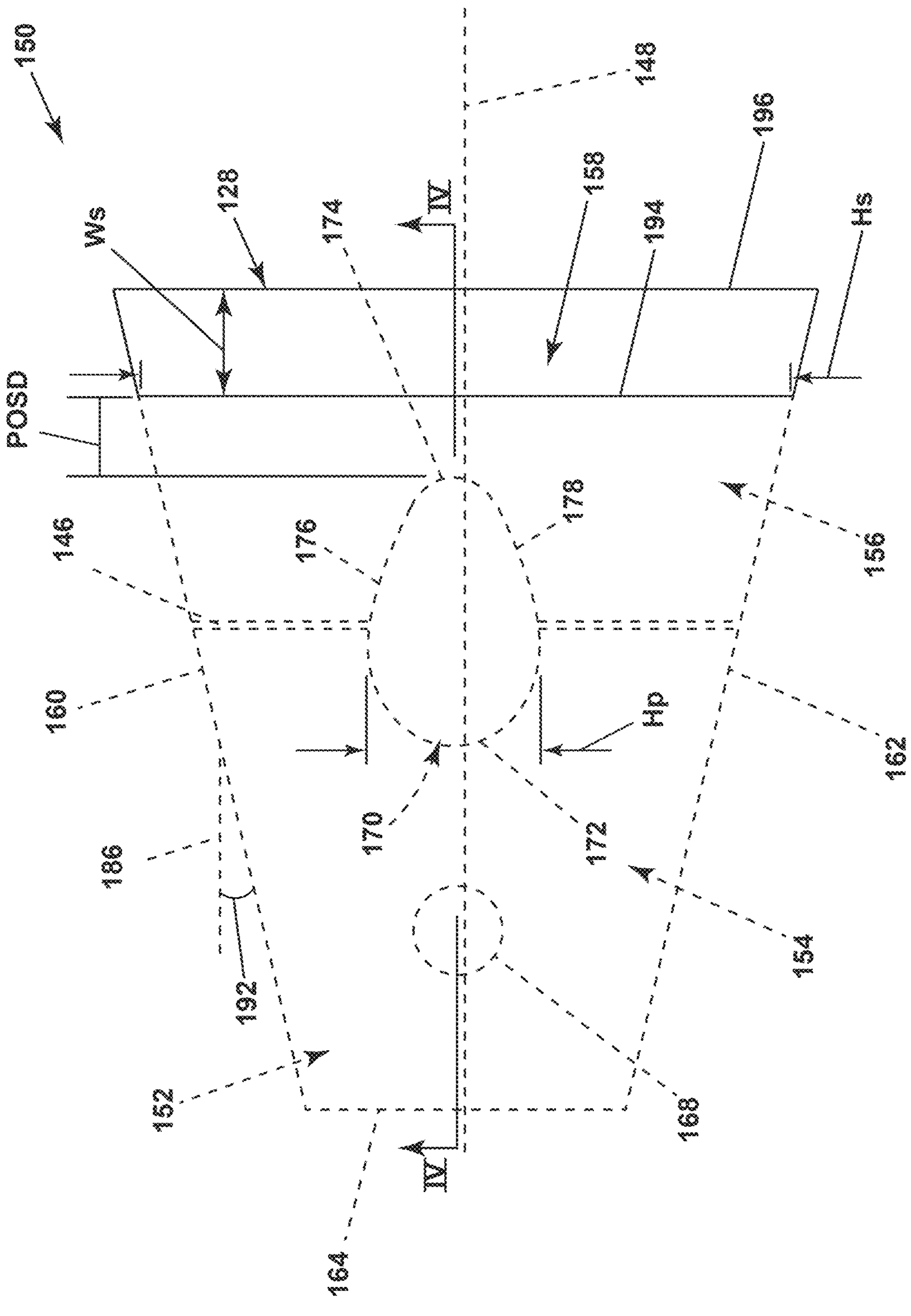
FIG. 3 is a top view of the cooling aperture of FIG. 2 having a pin extending among an impingement portion and a diffusion portion and showing portions of the cooling aperture that position beneath a surface of the airfoil of FIG. 2 in broken line, in accordance with an aspect of the present disclosure.

FIG. 3 shows a top view of the cooling aperture 150, with broken line portions being positioned beneath the exterior surface 128 (FIG. 2) of the outer wall 106 (FIG. 2). The cooling aperture 150 defines a cavity 152 which extends among an impingement portion 154 and a diffusion portion 156 that exhausts at a diffuser outlet 158. The cavity 152 is further defined between a first side 160 and a second side 162, with a rear side 164 extending between the first side 160 and the second side 162 opposite of the diffuser outlet 158. A longitudinal axis 148 can be defined extending between the rear side 164 and the diffuser outlet 158 equidistant between the first side 160 and the second side 162. One or both of the first side 160 and the second side 162 can be arranged at a side angle 192 relative to a parallel axis 186 arranged parallel to the longitudinal axis 148, defining an increasing cross-sectional area for the cavity 152 in a direction extending toward the diffuser outlet 158. In a non-limiting example, the side angle 192 can be greater than three degrees (3°), while any angle is contemplated. In another example non-limiting example, the side angle 192 can be different among the first side 160 and the second side 162, or among the impingement portion 154 and the diffusion portion 156, or combinations thereof. In non-limiting examples, the rate at which the cross-sectional area among the impingement portion 154 and the diffusion portion 156 can be the same, while individual, discrete, different, or variable rates of change for the cross-sectional area, as defined by the spacing between the first and second sides 160, 162, is contemplated. In this way, the first side 160, the second side 162, or both can be curved, linear, curvilinear, rounded, angled, circular, elliptical, ellipsoidal, conic, or combinations thereof. It is further contemplated that while the impingement portion 154 and the diffusion portion 156 have an increasing cross-sectional area extending in a direction toward the diffuser outlet 158, a decreasing cross-sectional area is contemplated, or discrete portions having increasing or decreasing cross-sectional areas.

The impingement portion 154 meets the diffusion portion 156 at a bend 146 (best appreciated in FIG. 4) in the cavity 152, while a cooling aperture 150 without a bend is contemplated. In one example, the bend 146 can have a zero length, defining a meeting between the impingement portion 154 and the diffusion portion 156, while a non-zero length for the bend 146 spacing the impingement portion 154 from the diffusion portion 156 is contemplated. Where the bend 146 has a non-zero length, the bend 146 can occupy or define a volume within the cooling aperture 150. A metering hole 168 couples to the impingement portion 154 for providing the cooling fluid flow (C) to the cooling aperture 150 from the cooling circuit 122 (FIG. 2). The metering hole 168 can define a hydraulic diameter ($d_h$). While one metering hole 168 is illustrated it is contemplated that there can be three or less metering holes 168 in a non-limiting example, while any number of metering holes is within the scope of this disclosure.

The diffuser outlet 158 extends between an upstream edge 194 and a downstream edge 196 relative to a flow direction through the cooling aperture 150 or along the outer wall 106 (FIG. 2). A cross-sectional area for the diffuser outlet 158 can be defined as the area between the first and second sides 160, 162, the upstream edge 194, and the downstream edge 196, and can be taken along the plane defined along the outer wall 106 (FIG. 2) at the diffuser outlet 158.

A slot height (Hs) can be defined as the distance between the first side 160 and the second side 162 at the upstream edge 194. In a non-limiting example, the slot height (Hs) can be defined as the length of the upstream edge 194, where the upstream edge 194 is linear. In a non-limiting example, the slot height (Hs) can be greater than or equal to 0.020 inches (0.508 millimeters) and less than or equal to 0.60 inches (15.24 millimeters). In another non-limiting example, the slot height (Hs) can be greater than or equal to 0.030 inches (0.762 millimeters) and less than or equal to 0.20 inches (5.08 millimeters). A slot width (Ws) can be defined as the distance between the upstream edge 194 and the downstream edge 196. The slot width (Ws) can be defined parallel to the longitudinal axis 148, for example, or can be defined as the shortest distance between the upstream edge 194 and the downstream edge 196. In a non-limiting example, the slot width (Ws) can be greater than or equal to 0.003 inches (0.0762 millimeters) and less than or equal to 0.075 inches (1.905 millimeters). In additional non-limiting examples, the slot width (Ws) can be greater than or equal to 0.008 inches (0.203 millimeters) and less than or equal to 0.035 inches (0.889 millimeters), or greater than or equal to 0.008 inches (0.203 millimeters) and less than or equal to 0.015 inches (0.381 millimeters).

A diffuser aspect ratio can be defined as the ratio of the hydraulic diameter (dn) of the metering hole 168 to the slot height (Hs). In a non-limiting example, the diffuser aspect ratio can be greater than or equal to two and less than or equal to 25. In another non-limiting example, the aspect ratio can be greater than or equal to three and less than or equal to 15.

A pin 170 is provided within the cavity 152 and extends among the impingement portion 154, the diffusion portion 156, and the bend 146, being spaced from the first side 160, the second side 162, and the rear side 164. The pin 170 extends between an upstream end 172 and a downstream end 174, where the upstream end 172 is nearest to the metering hole 168 or the rear side 164 and the downstream end 174 is nearest to the diffuser outlet 158. A first pin side 176 and a second pin side 178 extend between the upstream end 172 and the downstream end 174. The downstream end 174 is spaced from the diffuser outlet 158. While a single pin is shown, there may be three or less pins 170 in a non-limiting example. In another non-limiting example, any number of pins 170 is contemplated. In a non-limiting example where multiple pins are utilized, greater than or equal to 25% of the pins can have at least a portion positioned within the diffusion portion 156. In another non-limiting example, it is contemplated that at least one pin is fully positioned within the diffusion portion 156 (see FIG. 10 for example). In additional non-limiting examples, the pin 170 can at least partially extend within the diffusion portion 156, at least partially position at the bend 146 extending into the diffusion portion 156, can fully position within the diffusion portion 156, or position with the upstream end 172 positioned at the bend 146 with the remainder of the pin 170 extending into the diffusion portion 156. In another non-limiting example, the pin 170 can position within the cavity 152 without positioning within one or more of the impingement portion 154, the diffusion portion 156, or the bend 146. The pin 170 can define a pin height (Hp) as the maximum length of the pin 170 defined in a direction extending between the first side 160 and the second side 162 taken perpendicular to the longitudinal axis 148. In a non-limiting example, the pin height (Hp) divided by the slot height (Hs) can be greater than or equal to 0.1 or less than or equal to 0.8.

The pin 170 is spaced from the upstream edge 194 by a pin outlet spacing distance (POSD). In a non-limiting example, the pin outlet spacing distance (POSD) can be defined as the shortest distance between the pin 170 and the upstream edge 194. In additional non-limiting examples, the pin outlet spacing distance (POSD) can be measured as the distance between the downstream end 174 of the pin 170 and the upstream edge 194 in a direction parallel to the longitudinal axis 148 or taken along the longitudinal axis 148. In non-limiting examples, the pin outlet spacing distance (POSD) can be less than or equal to 0.040 inches (1.016 millimeters) or can be less than or equal to 0.025 inches (0.6354 millimeters).

The pin 170 includes an egg-like cross-sectional shape, while additional cross-sectional shapes are contemplated, including but not limited to egg-shaped, oval, pyriform, pear-shaped, airfoil-shaped, diamond-shaped, circular, linear, curved, square, rectangular, angled, curvilinear, elliptical, or combinations thereof. In a non-limiting example, the pin can be symmetric or asymmetric relative to the longitudinal axis 148. In another non-limiting example, the pin 170 can be non-undulating, or can have a variable density along at least a portion of the pin 170. A variable density can be a reducing density or an increasing density for the pin 170, for example, and can be defined in a direction extending toward the diffuser outlet 158. In a non-limiting example, a cross-sectional area for the pin 170 can be defined as cross-sectional area of the pin 170 taken along a plane parallel to the outer wall 106. In another non-limiting example, the cross-sectional area for the pin 170 can be a metal area of the pin 170. In a non-limiting example, the cross-sectional area of the pin 170 can occupy greater than or equal to 10% of the diffusion portion 156. In yet another non-limiting example, greater than or equal to 25% of a cross-sectional area of the pin 170 can be located within the diffusion portion 156, the bend 146, or both.

In another non-limiting example, the pin 170 can position completely within the diffusion portion 156, or extends from the bend 146 into the diffusion portion 156. The pin 170 can be symmetric about the longitudinal axis 148. However, an asymmetric shape for the pin 170, relative to the longitudinal axis 148, is contemplated.

Figure 4:
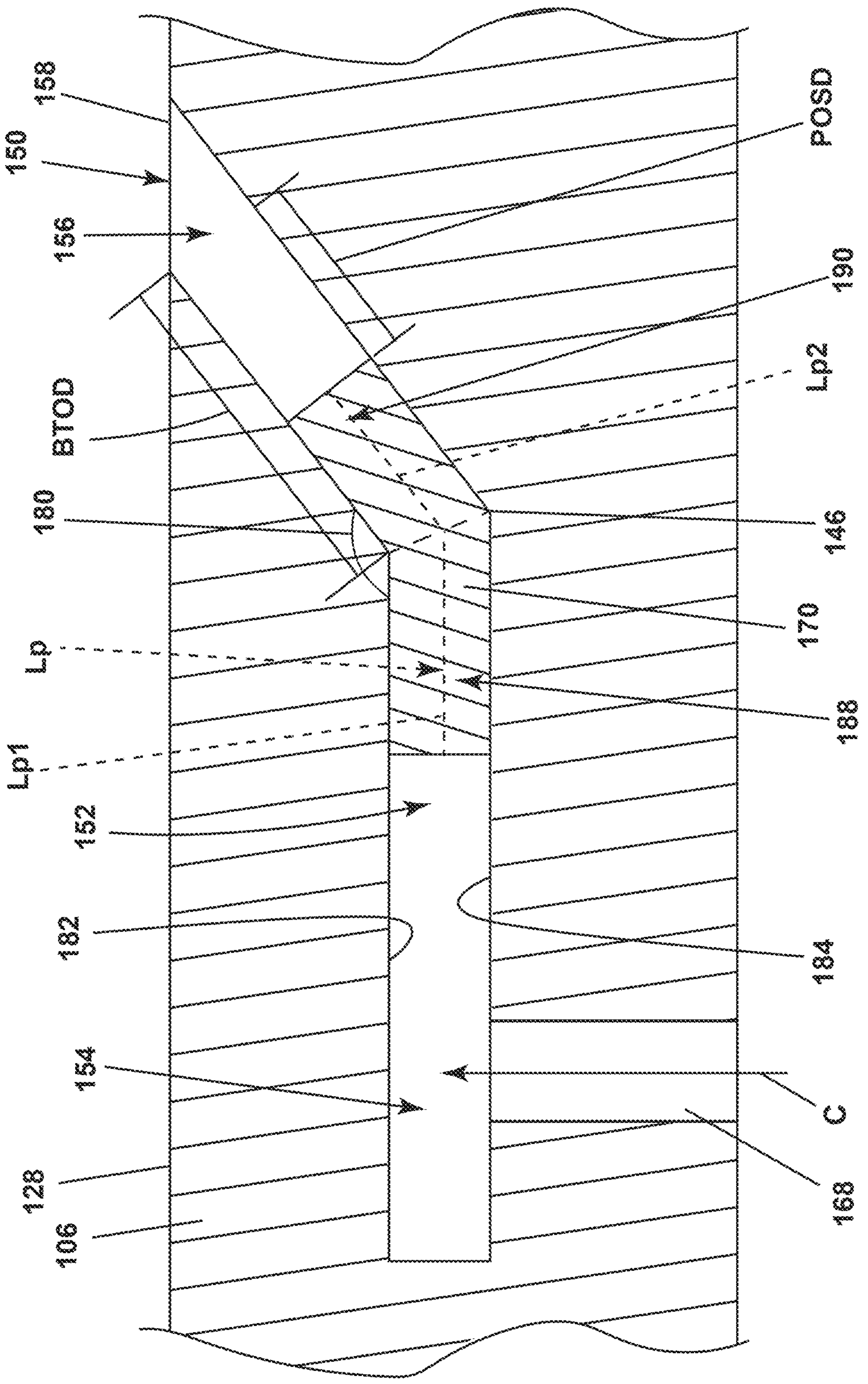
FIG. 4 is a sectional view of the cooling aperture of FIG. 3 taken along section IV-IV, in accordance with an aspect of the present disclosure.

Referring to FIG. 4, a section view of the cooling aperture 150 is shown along line IV-IV of FIG. 3 within the outer wall 106, better illustrating an angled orientation for the diffusion portion 156 relative to the impingement portion 154. That is, the impingement portion 154 can be arranged non-coplanar with the diffusion portion 156. Resultant of the bend 146, the diffusion portion 156 is orientated at an angle 180 relative the diffusion portion. In non-limiting examples, the angle 180 can be greater than or equal to 35 degrees (35°). In additional non-limiting examples, the angle 180 can be greater than or equal to 40 degrees (40°) or can be greater than or equal to 130 degrees (130°), while any angle 180 between 0 degrees (0°) and 180 degrees (180°) is contemplated.

The cavity 152 is further defined between an upper surface 182 and a lower surface 184. The metering hole 168 terminates at the lower surface 184 and the cooling fluid flow (C) provided through the metering hole 168 can impinge upon the upper surface 182 upon entering the impingement portion 154. In an alternate, non-limiting example, it is contemplated that the metering hole 168 can terminate at the upper surface 182 and impinge upon the lower surface 184. In another non-limiting example, the metering hole 168, or a longitudinal axis defined by the metering hole 168, can be offset from perpendicular to the upper surface 182 such that impingement of the cooling fluid flow (C) on the upper surface can be non-linear or non-orthogonal to the upper surface 182, which can be defined by the orientation of the metering hole 168. In one example, the pin 170 can be defined perpendicular to one or both of the upper surface 182 and the lower surface 184, while an orientation offset from perpendicular, or an angled orientation for the pin 170, relative to one or both of the upper surface 182 and the lower surface 184 is contemplated.

The pin 170 extends among the impingement portion 154 and the diffusion portion 156, spanning and extending across the bend 146. The pin 170 can include a first pin portion 188 within the impingement portion 154 and a second pin portion 190 within the diffusion portion 156. The first pin portion 188 can also be arranged at the angle 180 relative to the second pin portion 190, being determined by the angle 180 defined among the impingement portion 154 and the diffusion portion 156. The second pin portion 190, or any pin or portion thereof positioned within the diffusion portion 156 can be offset from perpendicular to the diffuser outlet 158.

A first pin portion length (Lp1) can be defined as the distance between the upstream end 172 and the bend 146, taken equidistant between the upper surface 182 and the lower surface 184. A second pin portion length (Lp2) can be defined as the distance between the bend 146 and the downstream end 174, taken equidistant between the upper surface 182 and the lower surface 184. In non-limiting examples, the second pin portion length (Lp2) can be greater than or equal to 0.015 inches (0.381 millimeters) or can be greater than or equal to 0.025 inches (0.635 millimeters). A pin length (Lp) can be defined as the summation of the first pin portion length (Lp1) and the second pin portion length (Lp2). In a non-limiting example, the second pin portion length (Lp2) divided by the pin length (Lp) can be greater than or equal to 0.10. In additional non-limiting examples, the second pin portion length (Lp2) divided by the pin length (Lp) can be greater than or equal to 0.25 or greater than or equal to 0.40.

In a non-limiting example, the cross-sectional area for the pin 170 can be measured along a plane equidistant between the upper surface 182 and the lower surface 184. More specifically, the cross-sectional area of the diffusion portion 156 can be defined along a plane taken equidistant between the upper surface 182 and the lower surface 184, and extending between the first and second sides 160, 162 (FIG. 3), the bend 146, and the diffuser outlet 158. The cross-sectional area for the pin 170 (or all pins where more than one is provided) within the diffusion portion 156 can be greater than or equal to 10% of the total cross-sectional area of the diffusion portion 156, in a non-limiting example. In an additional non-limiting example, the cross-sectional area for the pin 170 can occupy greater than or equal to 25% of the diffusion portion 156. The cross-sectional area of the pin 170 divided by the cross-sectional area of the diffuser outlet 158 can be greater than or equal to 0.2 and less than or equal to 4.0 in a non-limiting example.

A bend to outlet distance (BTOD) can be defined as the distance between the bend 146 and the upstream edge 194 of the diffuser outlet. In a non-limiting example, the bend to outlet distance (BTOD) can be defined as the shortest distance between the bend 146 and the upstream edge 194 of the diffuser outlet 158. In a non-limiting example, the pin outlet spacing distance (POSD) divided by the bend to outlet distance (BTOD) can be less than or equal to 0.6. In another non-limiting example, the pin outlet spacing distance (POSD) divided by the bend to outlet distance (BTOD) can be 0.4. It should be appreciated that increasing the pin outlet spacing distance (POSD) increases the area of the diffusion portion 156 between the pin 170 and the diffuser outlet 158. Too great of an area of the diffusion portion 156 defining the pin outlet spacing distance (POSD) divided by the bend to outlet distance (BTOD) that is greater than 0.6 may not provide suitable stiffness to mitigate compressive and operational forces imparted to the outer wall 106 at the cooling aperture 150.

In a non-limiting example, the impingement portion 154 and the diffusion portion 156 can be non-planar, non-linear, or both non-planar and non-linear. While the section view illustrated in FIG. 4 shows the impingement portion 154 and the diffusion portion 156 as generally planar, non-planar geometries are contemplated, such as having curved cross-sectional profile. In a non-limiting example, the impingement portion 154, the diffusion portion 156, or both can have a curvature curving toward the exterior surface 128.

In operation, the cooling fluid flow (C) is provided to the impingement portion 154 via the metering hole 168. The cooling fluid flow (C) impinges upon the upper surface 182 and spreads within the cavity 152. The cooling fluid flow (C) passes from the impingement portion 154 to the diffusion portion 156 across the bend 146. The cooling fluid flow (C) exhausts from the diffusion portion 156 at the diffuser outlet 158. The cooling fluid flow (C) passes along the pin 170 within the impingement portion 154, the diffusion portion 156, and while passing from the impingement portion 154 to the diffusion portion 156.

The cooling fluid flow (C) cools the outer wall 106, the pin 170, and any other structure defining the cooling aperture 150 via convection heat transfer. The cooling fluid flow (C) exhausts from the diffuser outlet 158 to form a cooling film along the exterior surface 128 of the outer wall 106.

Movement of the cooling fluid flow (C) along or across the pin 170 can increase local turbulence and flow rates, which can increase and improve effectiveness of the heat transfer.

The pin 170 provides for greater stiffness for the cooling aperture 150. Due to the height of the cooling aperture 150, such as that defined by the slot height (Hs) in FIG. 3, the cooling aperture 150 can have a reduced stiffness, which can be susceptible to high cycle stress and fatigue. Utilizing the pin 170 mitigates the reduction in stiffness and improves the stiffness for the cooling aperture 150. Such an increase in stiffness increases or improves the operating modes of the airfoil 104 (FIG. 2). Larger distances for the pin outlet spacing distance (POSD) can result in a greater distance between the pin 170 and the diffuser outlet 158, which can result in a reduction in the stiffness, as a result of a relatively larger portion of the outer wall 106 arranged above the cavity 152 downstream of the pin 170.

The pin 170 further provides additional support for the upper surface 182 spaced from the lower surface 184. During operation of the airfoil 104 (FIG. 2), engine forces can generate a compressive stress at the cooling aperture 150. The pin 170 supports the upper surface 182 and mitigates the compression stress by passing the stress from the upper surface 182 to the lower surface 184 through the pin 170, thereby increasing and improving component resilience and lifetime during cycle fatigue. Furthermore, mitigation of such stresses permits the use of larger aspect ratios for the cooling aperture 150, as compared to a cooling aperture without the benefit of the pin 170. In a non-limiting example, it is contemplated that the pin 170 is located only in the diffusion portion 156, only at the bend 146 (such as where the bend 146 includes a non-zero length), or only among the bend 146 and the diffusion portion 156 in order to mitigate the compressive stress within the diffusion portion 156, where such stresses can be greatest among the cooling aperture 150. Furthermore, the pin 170 provides a thermal conduction path from the upper surface 182, which can be the hottest area at the cooling aperture 150, permitting additional heat conduction along the pin 170 to the lower surface 184, increasing total convective heat transfer along the cooling aperture 150. The thermal conduction path defined by the pin 170 can mitigate heat and related thermal stresses by conducting the heat to the pin 170 and passing some heat to the cooling fluid flow (C) by convection.

As the pin 170 can span the impingement portion 154 and the diffusion portion 156, it provides support against compressive stress within both the impingement portion 154 and the diffusion portion 156, despite the angular offset. The compressive stresses generated during operating of the airfoil 104 can be unequal among the impingement portion 154 and the diffusion portion 156 due to the angular offset. The pin 170 as described herein can mitigate compressive stresses that differ among the impingement portion 154 and the diffusion portion 156 when spanning the two, despite the differences in stress.

Figure 5:
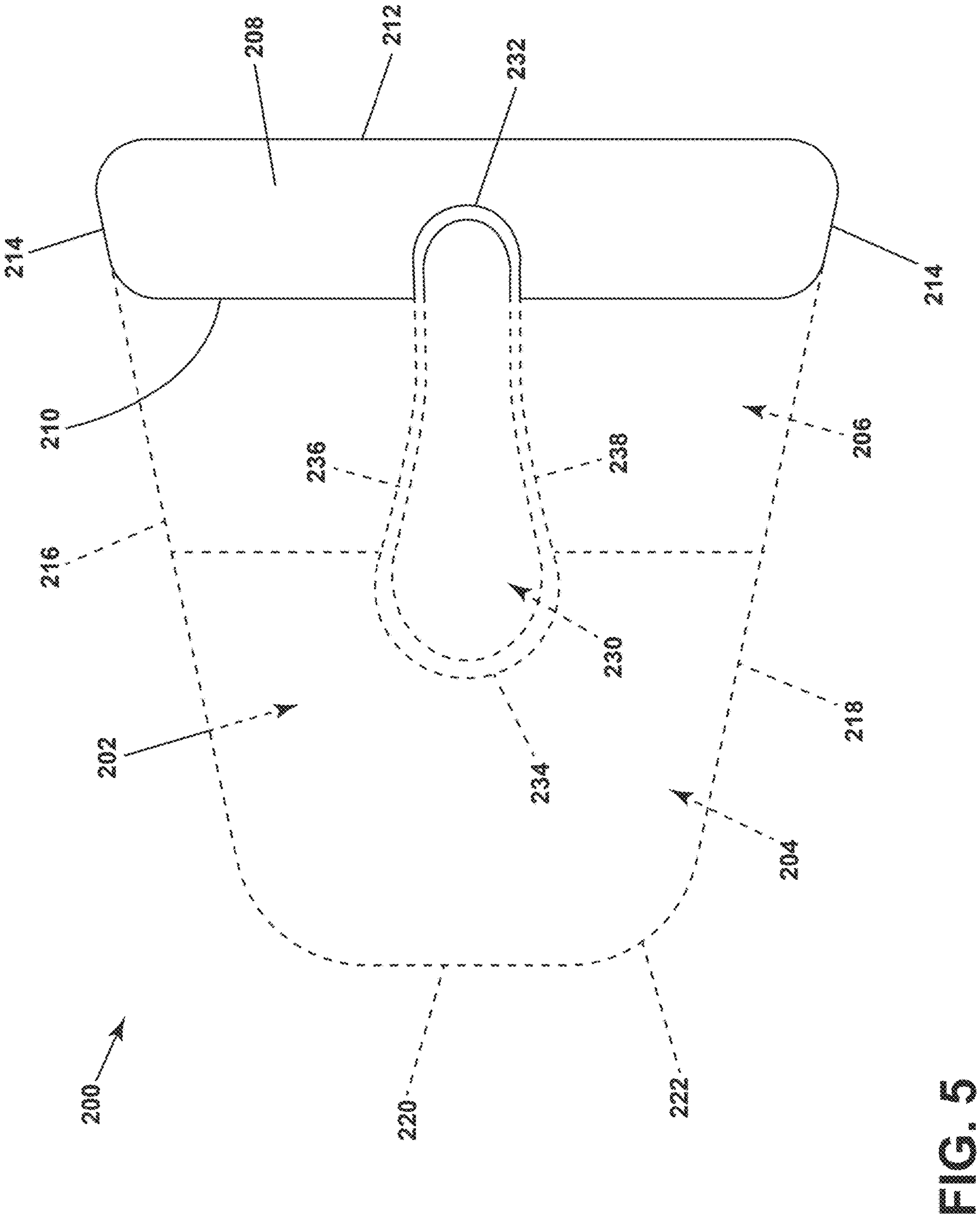
FIG. 5 is a top view of a cooling aperture having a pin that extends among an impingement portion and a diffusion portion, and extends to a diffuser outlet, in accordance with an aspect of the present disclosure.

Referring to FIG. 5, a cooling aperture 200 including a cavity 202 extending among an impingement portion 204 and a diffusion portion 206, terminating at a diffuser outlet 208. Portions of the cooling aperture 200 shown in broken line will be arranged beneath an outer wall of the component carrying the cooling aperture, such as beneath the outer wall 106 of the airfoil 104 of FIG. 2. The diffuser outlet 208 includes an upstream edge 210 spaced from a downstream edge 212 by opposing ends 214. The cavity 202 is further defined between a first side 216 and a second side 218, with a rear side 220 extending between the first side 216 and the second side 218 opposite of the diffuser outlet 208. Rounded transitions 222 can transition between the rear side 220 and each of the first side 216 and the second side 218.

A pin 230 is provided in the cavity 202 and extends among the impingement portion 204, the diffusion portion 206, and the diffuser outlet 208. That is, at least a portion of the pin 230 can extend into diffusion portion 206 such that it is visible within the diffuser outlet 208 from the top view. More specifically, the portion of the pin 230 shown in solid line is visible through the diffuser outlet 208, while the portion of the pin 230 shown in broken line is hidden beneath an outer wall, such as the outer wall 106 of the airfoil 104 of FIG. 2. While visible within the diffuser outlet 208, the pin 230 does not extend exterior of the cavity 202 through the diffuser outlet 208. However, an exemplary pin that does extend exterior of a diffuser outlet is contemplated.

The pin 230 includes a downstream end 232 spaced from an upstream end 234, with a first pin side 236 and a second pin side 238 extending between the downstream end 232 and the upstream end 234. The upstream end 234 can be larger or wider than that of the downstream end 232. The first pin side 236 and the second pin side 238 each include a concave curvature, transitioning from the wider upstream end 234 to the narrower downstream end 232. The downstream end 232 of the pin 230 can be positioned equidistant between the upstream edge 210 and the downstream edge 212 when the cooling aperture 200 is viewed from the top, while any arrangement of the downstream end 232 within the diffuser outlet 208 is contemplated.

Figure 6:
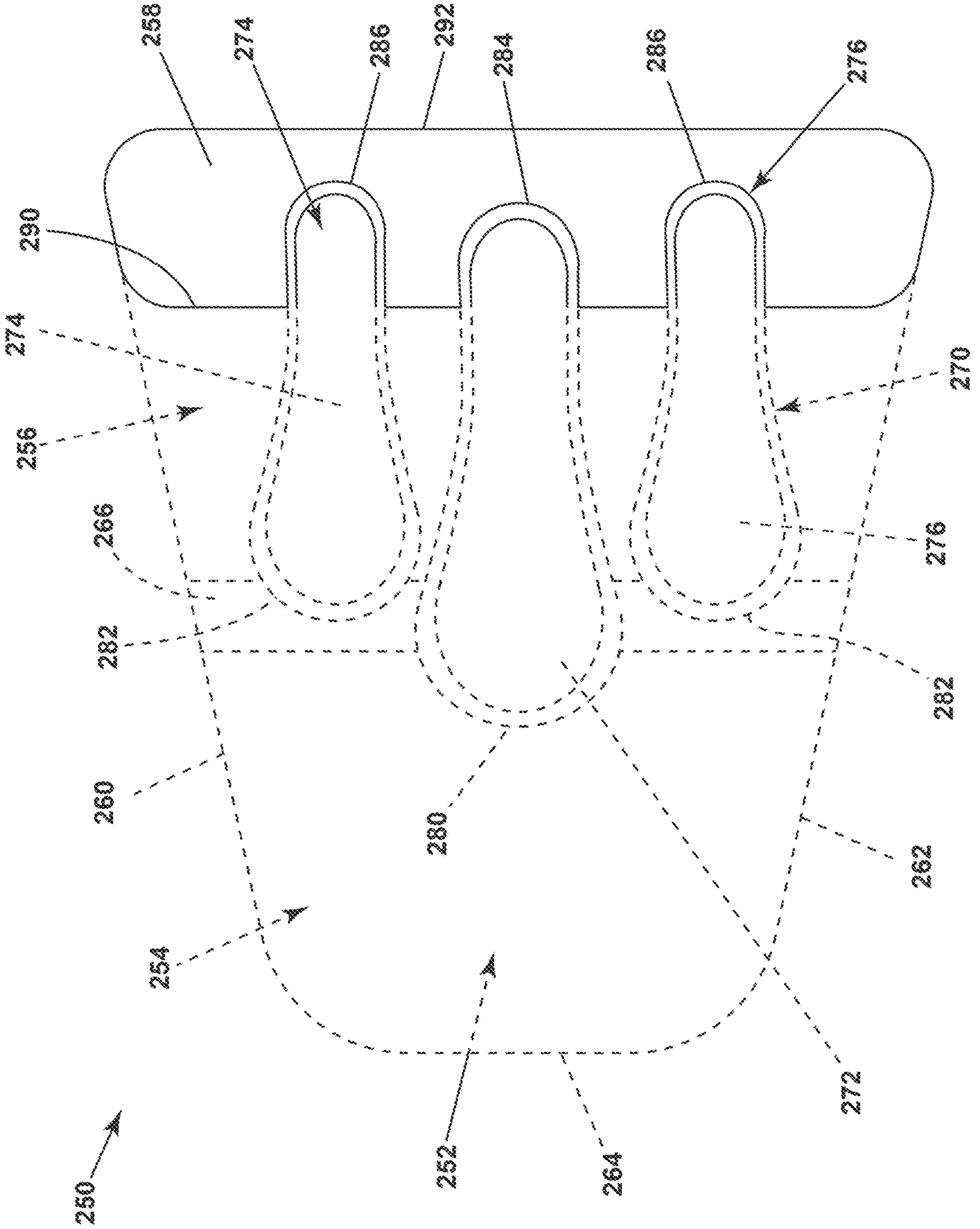
FIG. 6 is a top view of a cooling aperture having multiple pins extending among one or more of an impingement portion, a diffusion portion, and a diffuser outlet, in accordance with an aspect of the present disclosure.

FIG. 6 depicts a cooling aperture 250 defining a cavity 252 extending between an impingement portion 254 and a diffusion portion 256 exhausting at a diffuser outlet 258. The cavity 252 is further defined between a first side 260 spaced from a second side 262 and including a rear side 264 extending between the first side 260 and the second side 262 opposite of the diffuser outlet 258. A bend 266 having a non-zero length transitions between the impingement portion 254 and the diffusion portion 256.

The cooling aperture 250 includes multiple pins arranged as a set of pins 270 shown as three pins. The portions of the set of pins 270 shown in solid line are visible through the diffuser outlet 258, while the portion of the set of pins 270 shown in broken line is hidden beneath an outer wall, such as the outer wall 106 of the airfoil 104 of FIG. 2. The set of pins 270 can include a center pin 272 arranged centrally between a first side pin 274, positioned nearest to the first side 260, and a second side pin 276 positioned nearest to the second side 262. The first side pin 274 and the second side pin 276 can have the same shape and size, while the center pin 272 can be relatively larger than the first and second side pins 274, 276, while having the same shape. It should be appreciated that any sizing for any of the set of pins 270 is contemplated, which can include similar or dissimilar sizing in non-limiting examples. Furthermore, any positioning for any of the set of pins 270 is contemplated, such as symmetric positioning of the first and second side pins 274, 276 relative to the center pin 272 or the first and second sides 260, 262, while an asymmetric arrangement is contemplated. In a non-limiting example, each pin among the set of pins 270 can each be spaced from any of the other pins among the set of pins 270 by at least 0.010 in (0.254 mm).

The center pin 272 can be positioned forward of the first and second side pins 274, 276, having an upstream end 280 that is arranged forward of an upstream end 282 of each of the first and second side pins 274, 276. The forward positioning of the center pin 272 further results in a downstream end 284 that is also forward of downstream ends 286 of the first and second side pins 274, 276, while alternate positioning is contemplated, such as aft of the downstream ends 286 of the first and second side pins 274, 276. The downstream end 284 of the center pin 272 can be positioned equidistant between an upstream edge 290 and a downstream edge 292 of the diffuser outlet 258, while the downstream ends 286 of the first and second side pins 274, 276 can be arranged nearer to the downstream edge 292 than the upstream edge 290. In alternative, non-limiting examples, any positioning of the downstream ends 284, 286 of the set of pins 270 is contemplated, which may or may not align with other pins of the set of pins 270.

The upstream end 280 of the center pin 272 can be positioned in the impingement portion 254, while the downstream end 284 can be positioned in the diffusion portion 256 at the diffuser outlet 258. The upstream ends 282 for the first and second side pins 274, 276 are positioned within the bend 266, while positioning of the upstream ends 282 in the impingement portion 254 or the diffusion portion 256 is contemplated. In an alternative example, the bend 266 can have a zero length, such that the upstream ends 282 of the first and second side pins 274, 276 are positioned within the impingement portion 254 or the diffusion portion 256, while the upstream ends 282 of the first and second side pins 274, 276 are positioned within the diffusion portion 256 at the diffuser outlet 258. In alternative, non-limiting examples, the upstream ends 280, 282 can be positioned in or among the impingement portion 254 or the diffusion portion 256, or a combination thereof, while the downstream ends 284, 286 can be positioned in or among the diffusion portion 256 or the diffuser outlet 258, while pins having an upstream end 280, 282 or downstream end 284, 286 in one or more of the impingement portion 254, the diffusion portion 256, or the diffuser outlet 258, or combinations thereof is contemplated.

Figure 7:
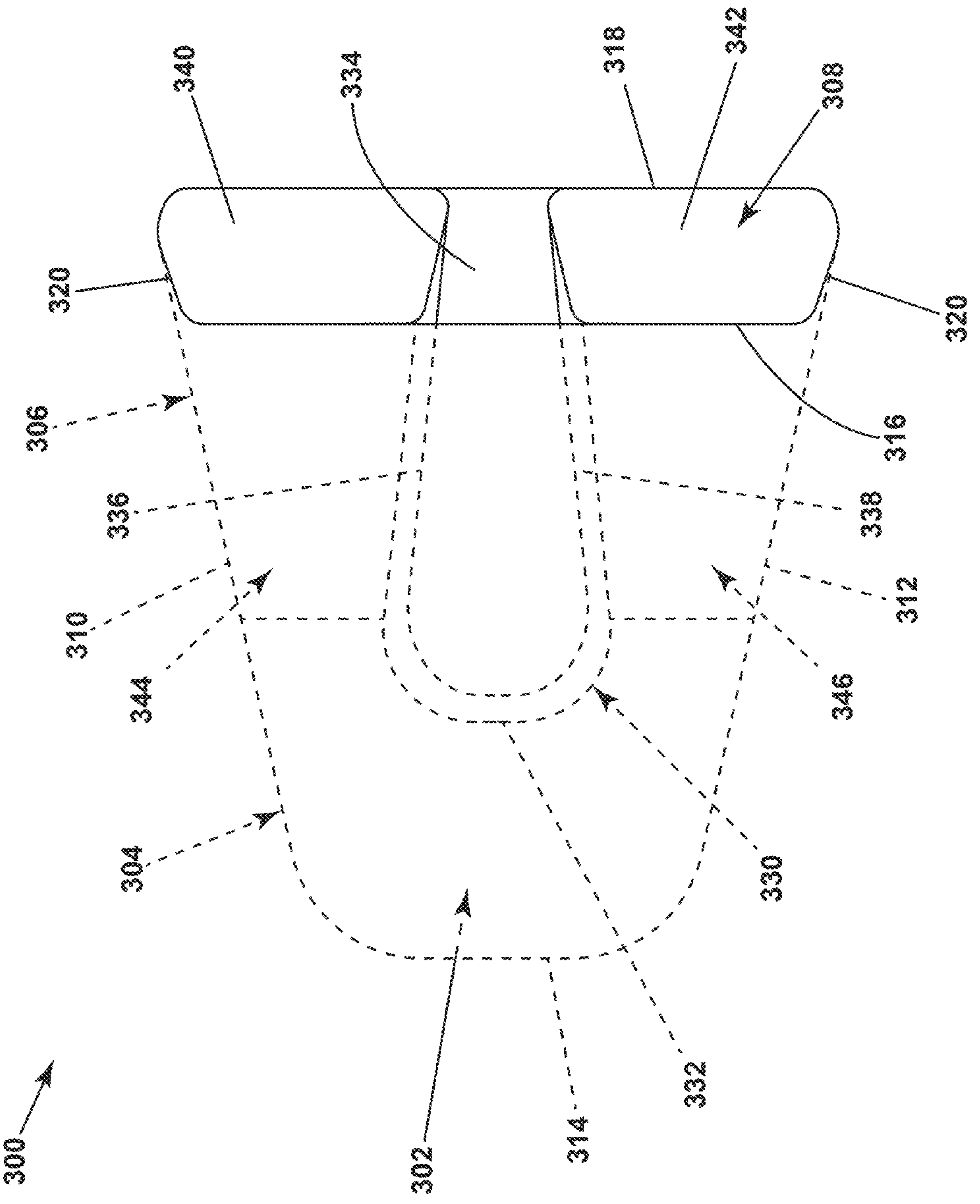
FIG. 7 is a top view of a cooling aperture having a pin that extends among an impingement portion and a diffusion portion, with the pin terminating at and dividing the diffuser outlet, in accordance with an aspect of the present disclosure.

Referring to FIG. 7, a cooling aperture 300 includes a cavity 302 extending among an impingement portion 304 and a diffusion portion 306 exhausting at a diffuser outlet 308. A first side 310 is spaced from a second side 312 by a rear side 314 positioned opposite of the diffuser outlet 308. The diffuser outlet 308 includes an upstream edge 316 spaced from a downstream edge 318 and extending between opposing ends 320.

A pin 330 is provided within the cavity 302. The portion of the pin 330 shown in solid line is visible at the diffuser outlet 308, while the portion of the pin 330 shown in broken line is hidden beneath an outer wall, such as the outer wall 106 of the airfoil 104 of FIG. 2. The pin 330 includes an upstream end 332 spaced from a downstream end 334 by a first pin side 336 and a second pin side 338. The downstream end 334 terminates within and occupies a portion of the diffuser outlet 308, separating, dividing, or bisecting the diffuser outlet 308 into a first outlet portion 340 and a second outlet portion 342. The downstream end 334 of the pin 330 can be formed flush with the outer wall 106 (FIG. 2) at the diffuser outlet 308 such that no portion of the pin 330 extends exterior of the cavity 302.

While the cooling aperture 300 is illustrated as generally symmetric, non-symmetric cooling apertures are contemplated. For example, the pin 330 can separate the diffusion portion 306 into a first diffusion portion 344 and a second diffusion portion 346 that can be different than the first diffusion portion 344. In a non-limiting example, the size, shape, volume, or cross-sectional area of the first diffusion portion 344 can be different than the second diffusion portion 346. In another non-limiting example, one of the first or second diffusion portions 344, 346 can angle or curve at a rate different than that of the other of the first or second diffusion portions 344, 346. Such an angle or curvature can be in any direction, such as toward the diffuser outlet 308, toward the first side 310 or the second side 312, or in a direction extending into or out of the page as shown in FIG. 7, or combinations thereof.

Figure 8:
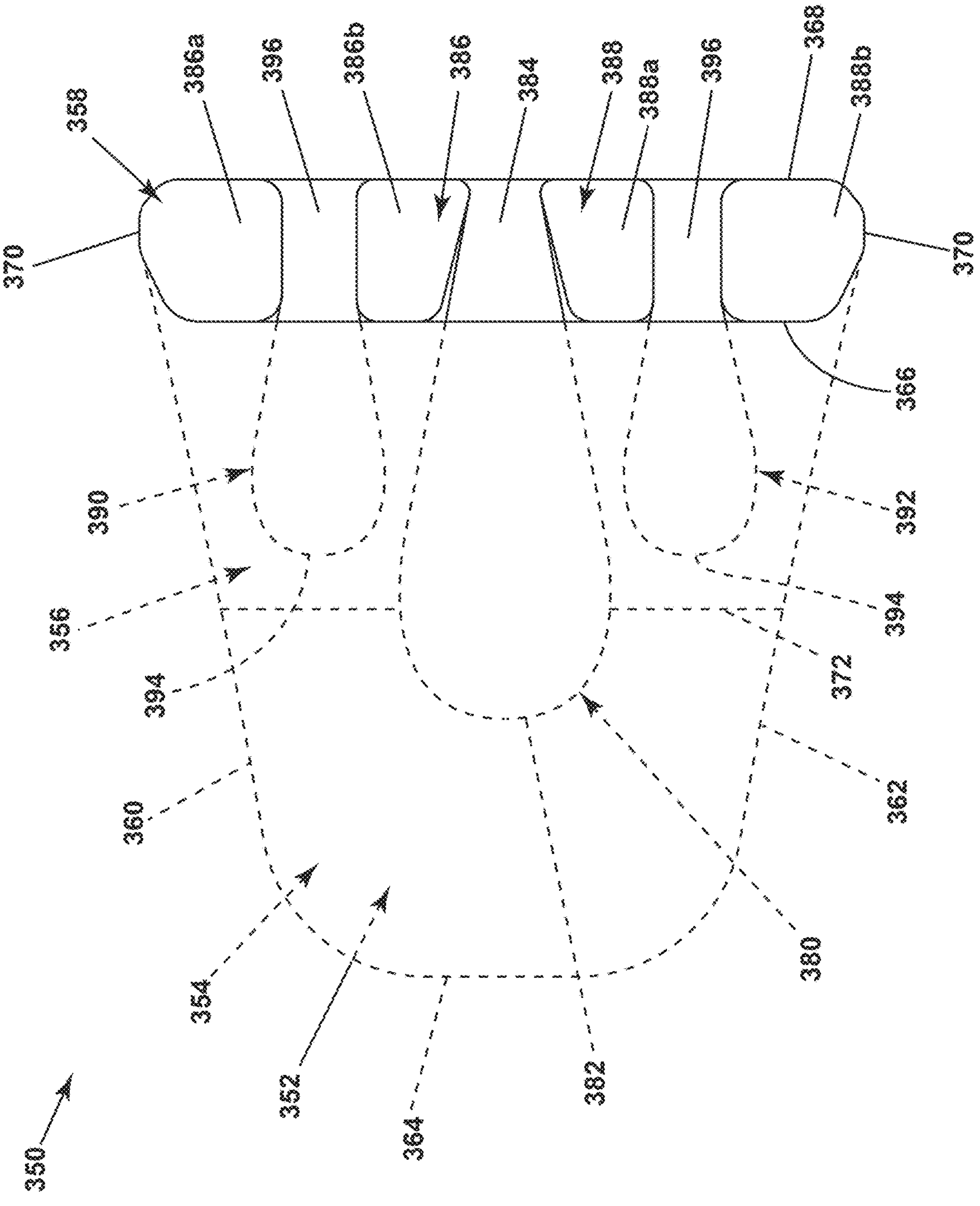
FIG. 8 is a top view of a cooling aperture having multiple pins that each extend among one or more of an impingement portion and a diffusion portion, and each pin of the multiple pins terminating at and dividing the diffuser outlet, in accordance with an aspect of the present disclosure.

Referring to FIG. 8, a cooling aperture 350 includes a cavity 352 extending among an impingement portion 354 and a diffusion portion 356 exhausting at a diffuser outlet 358. A first side 360 is spaced from a second side 362 by a rear side 364 positioned opposite of the diffuser outlet 358. The diffuser outlet 358 includes an upstream edge 366 spaced from a downstream edge 368 and extending between opposing ends 370. A first pin 380, a second pin 390, and a third pin 392 are positioned within the cavity 352. The portion of the first, second, and third pins 380, 390, 392 shown in solid line is visible at the diffuser outlet 358, while the portions of the first, second, and third pins 380, 390, 392 shown in broken line are hidden beneath an outer wall, such as the outer wall 106 of the airfoil 104 of FIG. 2.

The first pin 380 includes an upstream end 382 positioned within the impingement portion 354 and a downstream end 384 positioned at the diffuser outlet 358, separating, dividing, or bisecting the diffuser outlet 358 into a first diffuser portion 386 and a second diffuser portion 388. The downstream end 384 can be formed flush with the diffuser outlet 358 and with an outer wall, such as the outer wall 106 of FIG. 2.

A second pin 390 and a third pin 392 each include an upstream end 394 positioned within the diffusion portion 356, and a downstream end 396 positioned at the diffuser outlet 358. The second and third pins 390, 392 further separate and bisect the diffuser outlet 358, having the downstream end 396 terminate flush with the diffuser outlet 358. The second pin 390 separates the first diffuser portion 386 into a first and second diffuser sub-portion **386*a*, 386*b* and the third pin 392 separate the second diffuser portion 388 into a third and fourth diffuser sub-portion 388*a*, 388*b***.

The first pin 380 can have a similar shape as that of the second and third pins 390, 392, while being relatively larger than that of the second and third pins 390, 392, while differing shapes are contemplated. In additional non-limiting examples, the first, second, and third pins 380, 390, 392 can have any shape or size, similar or dissimilar from that of the others of the first, second, and third pins 380, 390, 392. While the first pin 380 includes the upstream end 382 within the impingement portion 354 and the second and third pins 390, 392 include an upstream end 394 within the diffusion portion 356, any position for the upstream ends 382, 394 is contemplated, such as within the impingement portion 354, the diffusion portion 356, or at a bend 372 between the impingement portion 354 and the diffusion portion 356.

Figure 9:
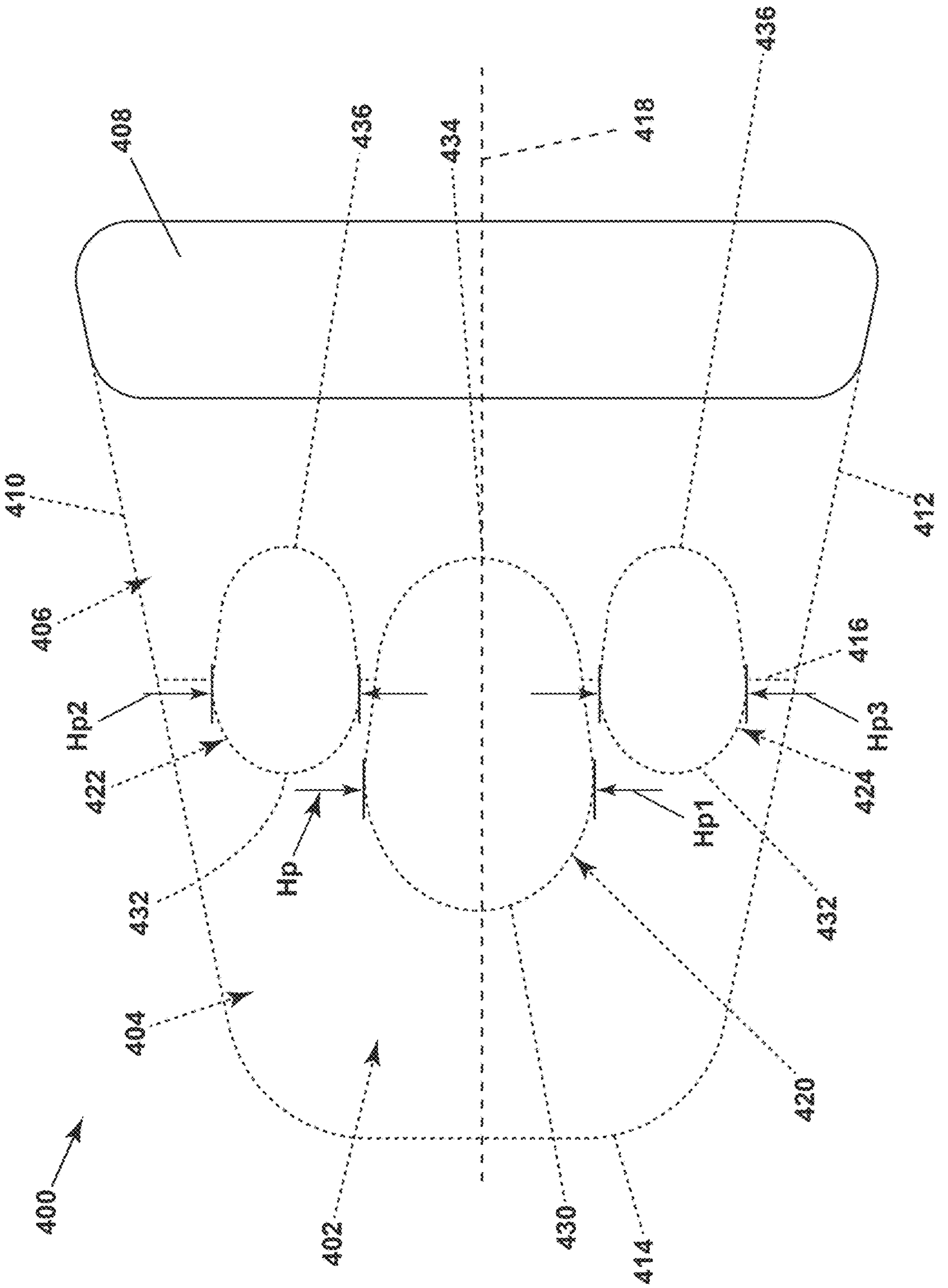
FIG. 9 is a top view of a cooling aperture having multiple pins at different longitudinal positions extending among an impingement portion and a diffusion portion, in accordance with an aspect of the present disclosure.

Referring to FIG. 9, a cooling aperture 400 includes a cavity 402 extending among an impingement portion 404 and a diffusion portion 406 exhausting at a diffuser outlet 408. A first side 410 is spaced from a second side 412 by a rear side 414 positioned opposite of the diffuser outlet 408. The impingement portion 404 meets the diffusion portion 406 at a bend 416.

A first pin 420 is provided within the cavity 402 and extends among the impingement portion 404 and the diffusion portion 406. A second pin 422 is positioned between the first pin 420 and the first side 410, and a third pin 424 is positioned between the first pin 420 and the second side 412, and the second and third pins 422, 424 extend among the impingement portion 404 and the diffusion portion 406. The first pin 420 can define a first pin height (Hp1), the second pin 422 can define a second pin height (Hp2), and the third pin 424 can define a third pin height (Hp3). A pin height (Hp) can be defined for the cooling aperture 400 where multiple pins are utilized. The pin height (Hp) can be defined as the sum of all pin heights of the first, second, and third pin heights (Hp1), (Hp2), (Hp3) for the first, second, and third pins 420, 422, 424. Each pin height (Hp1), (Hp2), (Hp3) can be defined as the maximum length of the pin defined in a direction between the first and second sides 410, 412, or perpendicular to a longitudinal axis 418 defined equidistant between the first and second sides 410, 412. Additionally, the pin height (Hp) can be defined as the sum of all pin heights for all pins that are nearest to the diffuser outlet 408. More specifically, where multiple pins are utilized, the pins that are nearest to the diffuser outlet 408 can be those that contain no intermediate pin between the diffuser outlet and the pin nearest to the diffuser outlet 408.

The first pin 420 is positioned forward of the second pin 422 and the third pin 424. That is, the first pin 420 includes an upstream end 430 that is positioned forward of upstream ends 432 of the second and third pins 422, 424, and includes a downstream end 434 that is positioned forward of downstream ends 436 of the second and third pins 422, 424.

In alternative non-limiting examples, any positioning of one or more of the pins 420, 422, 424 is contemplated, being aligned with, positioned forward of, or positioned aft of the first, second, and third pins 420, 422, 424, or having the upstream ends 430, 432 or the downstream ends 434, 436 with any positioning in the impingement portion 404, the diffusion portion 406, or at the bend 416. It is contemplated that one or more of the first, second, and third pins 420, 422, 424 can be positioned wholly or partially within one or both of the impingement portion 404 or the diffusion portion 406. In another non-limiting example, the percentage of pins that have at least a portion of the pin positioned within the diffusion portion 406 is greater than or equal to 25%.

Figure 10:
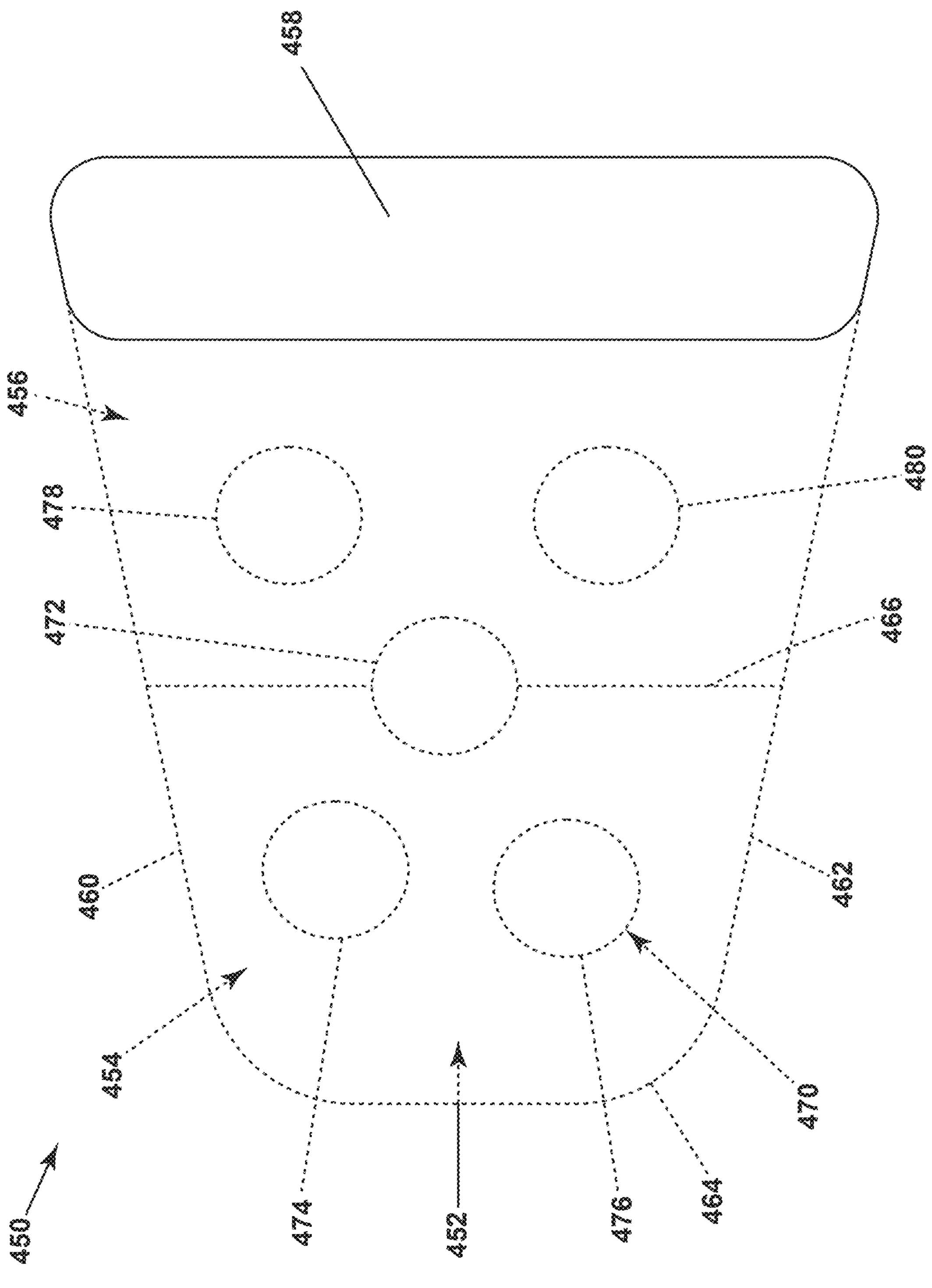
FIG. 10 is a top view of a cooling aperture having multiple pins, with some pins of the multiple pins positioned in an impingement portion, some pins of the multiple pins positioned in a diffusion portion, and with one pin of the multiple pins spanning the impingement portion and the diffusion portion, in accordance with an aspect of the present disclosure.

Referring to FIG. 10, a cooling aperture 450 includes a cavity 452 extending among an impingement portion 454 and a diffusion portion 456 exhausting at a diffuser outlet 458. A first side 460 is spaced from a second side 462 by a rear side 464 positioned opposite of the diffuser outlet 458. The impingement portion 454 transitions to the diffusion portion 456 at a bend 466.

A set of pins 470 are arranged within the cavity 452 including a first pin 472 extending among the impingement portion 454 and the diffusion portion 456 and extending across the bend 466. A second and third pin 474, 476 are arranged within the impingement portion 454 and a fourth and fifth pin 478, 480 are arranged within the diffusion portion 456. It should be appreciated that the set of pins 470 can be arranged within the cavity 452 including one or more pins arranged only within the impingement portion 454, only within the diffusion portion 456, or extending among the impingement portion 454 and the diffusion portion 456 in any arrangement. Furthermore, while the cross-sectional shape for the set of pins 470 is circular, any suitable cross-sectional shape for the set of pins 470 is contemplated. In a non-limiting example, it is contemplated that at least one pin 478, 480 is positioned fully within the diffusion portion 456, while additional pins within the impingement portion 454 or at the bend 466 are contemplated, like the first, second, and third pins 472, 474, 476.

In a non-limiting example, the set of pins 170 can define a pin density as the spacing of the set of pins 170. A greater pin density can be defined where a relatively larger portion of the cross-sectional area of the cavity 452 is occupied by the set of pins 170, and a lesser pin density can be defined where a relatively lesser portion of the cross-sectional area of the cavity 452 is occupied by the set of pins 170. In another non-limiting example, the pin density can vary along the cooling aperture 450. More specifically, the pin density can increase or decrease in a direction toward the diffuser outlet 458. An increase or decrease in pin density can be defined by having a relatively greater or lesser number of pins, a change in cross-sectional area of the pins, or a change in size or shape of the pins extending in a direction toward the diffuser outlet 458.

Figure 11:
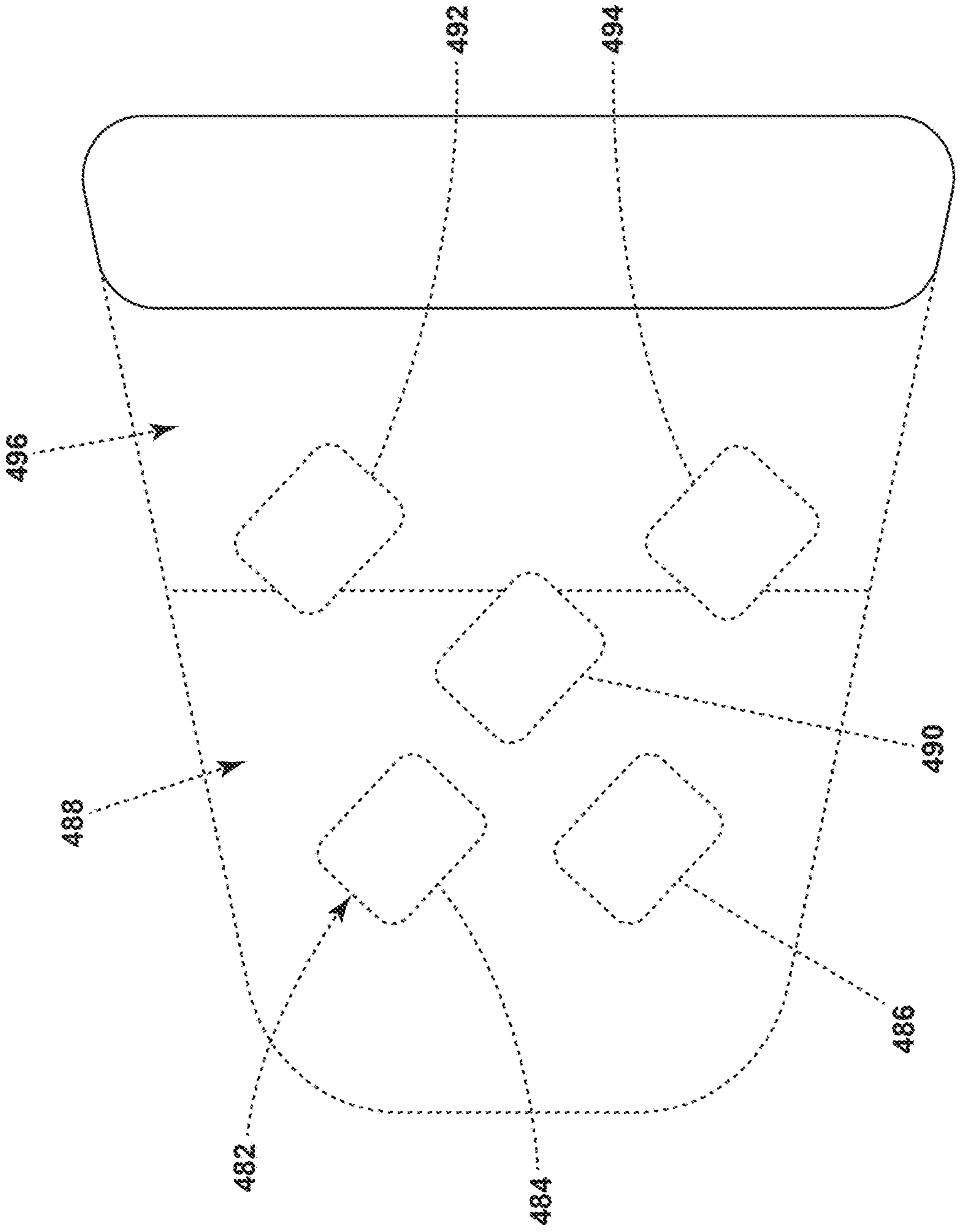
FIG. 11 is a top view of a cooling aperture having multiple pins, with some pins of the multiple pins positioned in an impingement portion, and some pins of the multiple pins spanning the impingement portion and a diffusion portion at different longitudinal positions, in accordance with an aspect of the present disclosure.

FIG. 11 can be substantially similar to FIG. 10, and therefore, the discussion will be limited to differences between the two. Specifically, a set of pins 482 have a rectangular cross-sectional shape, with rounded corners, as compared to the circular cross-sectional shape of the set of pins 470 of FIG. 10. Furthermore, a first and second pin 484, 486 are arranged within an impingement portion 488, while third, fourth, and fifth pins 490, 492, 494 extend among both the impingement portion 488 and a diffusion portion 496. The third pin 490 is arranged such that a larger portion of the third pin 490 is positioned within the impingement portion 488, while the fourth and fifth pins 492, 494 are arranged such that a larger portion of the fourth and fifth pins 492, 494 are positioned within the diffusion portion 496. It should be appreciated that any shape, cross-sectional shape, or size for the set of pins 482 is contemplated, including but not limited to circular, square, rectangular, rounded, having corners, triangular, oval, elliptical, racetrack, cubic, cylindrical, spherical, angled, linear, curved, geometric, or combinations thereof in non-limiting examples.

In a non-limiting example, greater than 25% of the pins, by count, among the set of pins 482, can have at least a portion positioned within the diffusion portion 496. In another non-limiting example, greater than 25% of the pins, by volume, among the set of pins can be positioned within the diffusion portion 496.

Referring to FIGS. 12A-12H, different exemplary pins are shown with different shapes or arrangements within a cooling aperture. Each cooling aperture includes a bend defined between an impingement portion and a diffusion portion. Portions shown in broken line are arranged beneath a surface of the component carrying the cooling aperture, such as beneath the exterior surface 128 of the airfoil 104 of FIG. 2, for example. It should be appreciated that the different cooling apertures described among FIGS. 12A-12H can all be utilized within a common engine, such as the gas turbine engine 10 of FIG. 1, or within a common component, such as the airfoil 104 of FIG. 2, and it should be understood that the cooling apertures are not mutually exclusive.

Figure 12A:
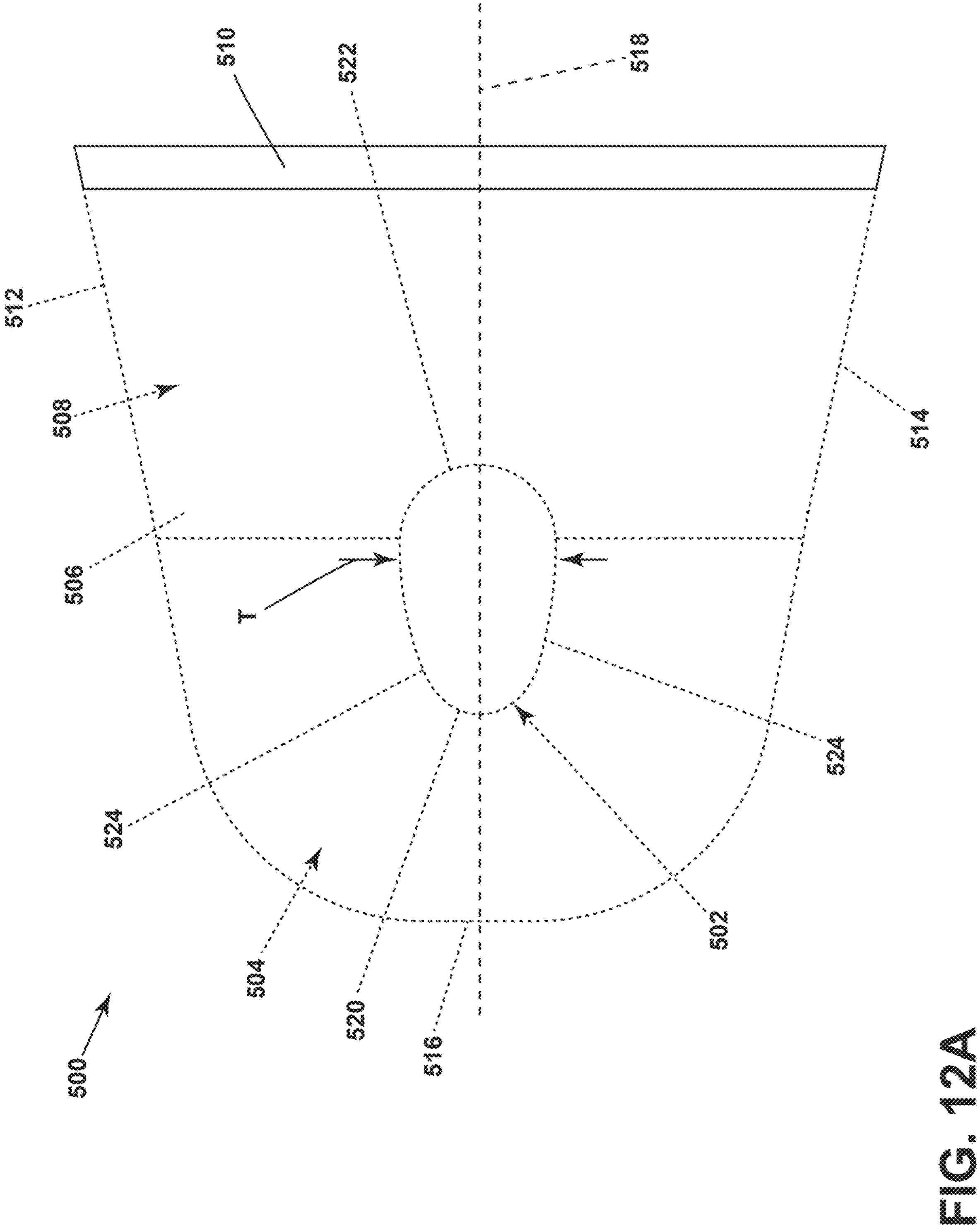
FIGS. 12A-12H show top views of various exemplary cooling apertures having one or more pins with various cross-sectional shapes and thicknesses extending among one or more of an impingement portion, a diffusion portion, and a transition therebetween, in accordance with an aspect of the present disclosure.

Referring to FIG. 12A, a cooling aperture 500 includes a pin 502 that extends between an impingement portion 504, a bend 506, and a diffusion portion 508, exhausting at a diffuser outlet 510. A first side 512 is spaced from a second side 514 by a rear side 516 opposite of the diffuser outlet 510. A longitudinal axis 518 can be defined extending between the rear side 516 and the diffuser outlet 510 equidistant between the first side 512 and the second side 514.

The pin 502 includes an upstream end 520 spaced from a downstream end 522 by opposing sides 524. The upstream end 520 is thinner than the downstream end 522, such that the pin 502 has an increasing thickness (T) within the impingement portion 504, with the thickness (T) defined perpendicular to the longitudinal axis 518. The pin 502 increases in thickness (T) toward the bend 506 and begins to decrease in thickness (T) downstream of the bend 506. The pin 502 further decreases in thickness (T) within the diffusion portion 508 terminating at the downstream end 522.

Figure 12B:
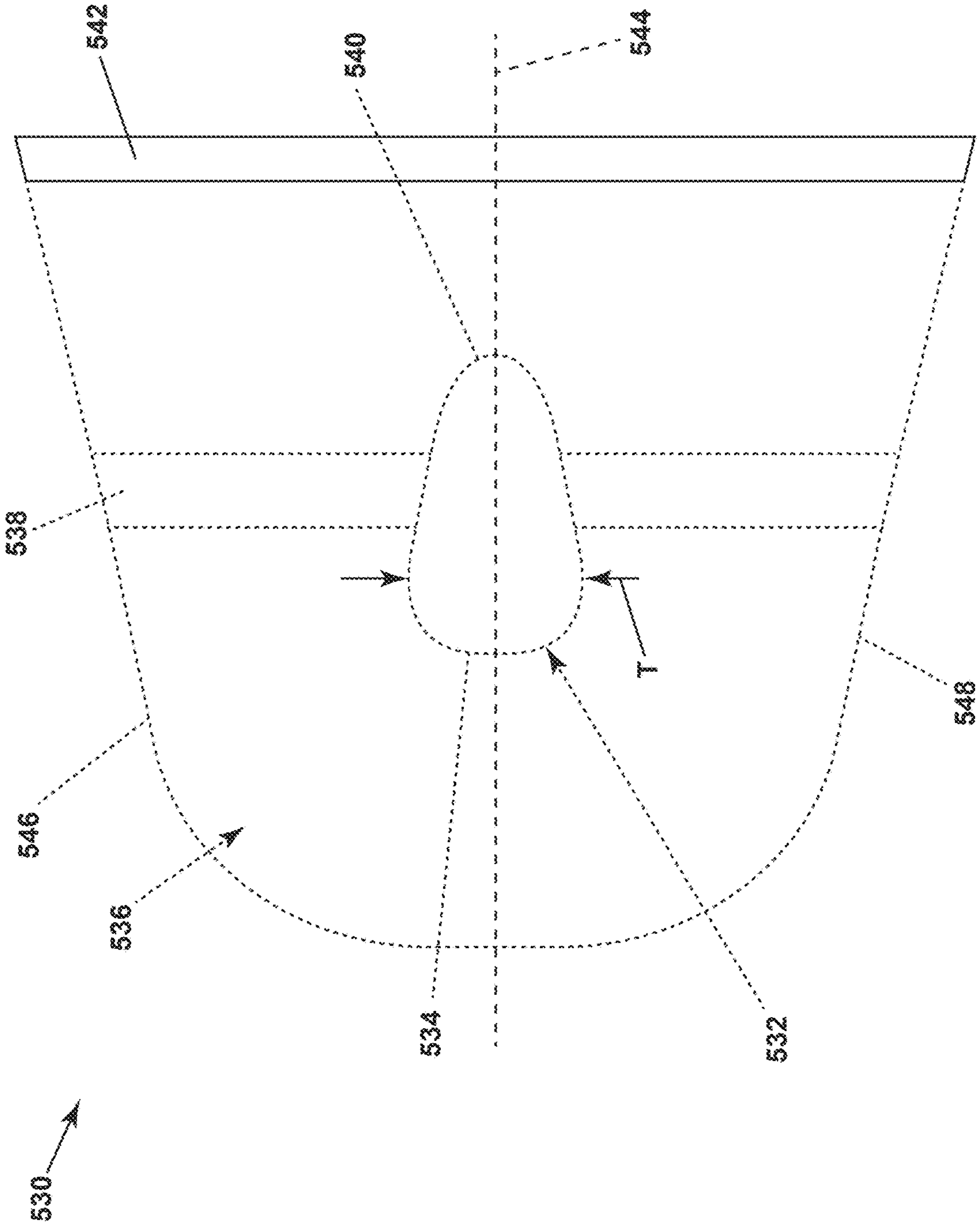

Referring to FIG. 12B, a cooling aperture 530 includes a pin 532 that has an upstream end 534 positioned within an impingement portion 536, extends across a bend 538 with a non-zero length, and terminates at a downstream end 540 within a diffusion portion 542. A longitudinal axis 544 can be defined equidistant between a first side 546 and a second side 548. The pin 532 has a thickness (T) that increases and then decreases within the impingement portion 536 in a direction toward the bend 538. The pin 532 includes a decreasing thickness (T) that decreases at a constant rate within the bend 538 and terminates at the downstream end 540 within the diffusion portion 542. The pin 532 can include an increasing rate of decreasing thickness (T) within the diffusion portion 542. In an alternative example, where the bend 538 includes a zero-length, at least a portion of the decreasing thickness (T) with a constant rate of change can be positioned within the impingement portion 536 or the diffusion portion 542.

Figure 12C:
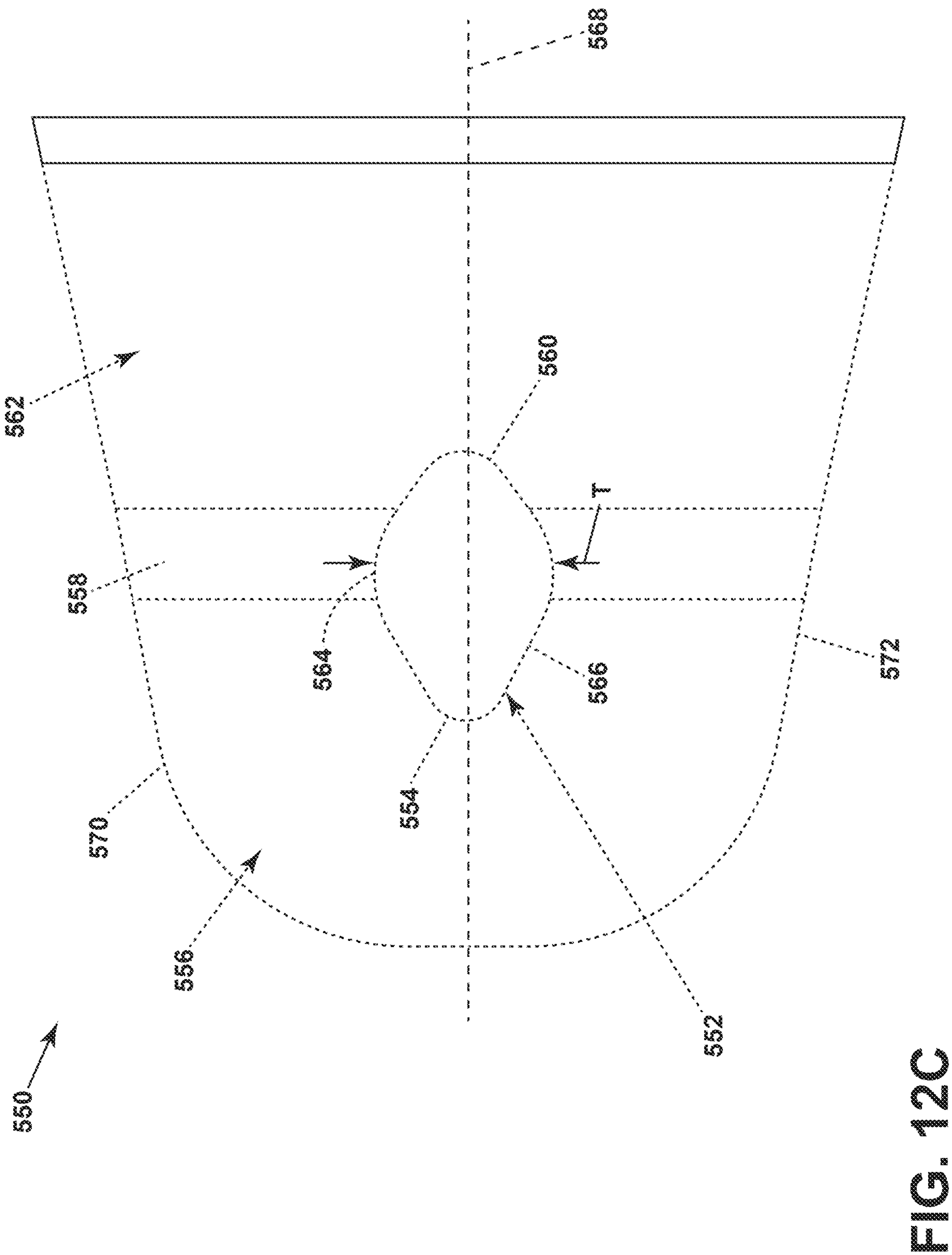

FIG. 12C illustrates a cooling aperture 550 that includes a pin 552 with an upstream end 554 positioned within an impingement portion 556, extends across a bend 558 having a non-zero length, and terminates at a downstream end 560 within a diffusion portion 562. A first pin side 564 is spaced from a second pin side 566 by the upstream end 554 and the downstream end 560. A longitudinal axis 568 can be defined equidistant between a first side 570 and a second side 572 of the cooling aperture 550.

The pin 552 can include an increasing thickness (T) within the impingement portion 556, and transitions from an increasing thickness (T) to a decreasing thickness (T) within the bend 558. The pin 552 includes a decreasing thickness (T) within the diffusion portion 562, terminating at the downstream end 560. The transition from an increasing thickness (T) to a decreasing thickness (T) within the bend 558 defines a diamond cross-sectional shape for the pin 552, having rounded corners. In an alternative example where the bend 558 includes a zero-thickness, the transition from an increasing thickness (T) to a decreasing thickness (T) can be at the bend 558, while positioning the transition within the impingement portion 556 or the diffusion portion 562 is contemplated.

Figure 12D:
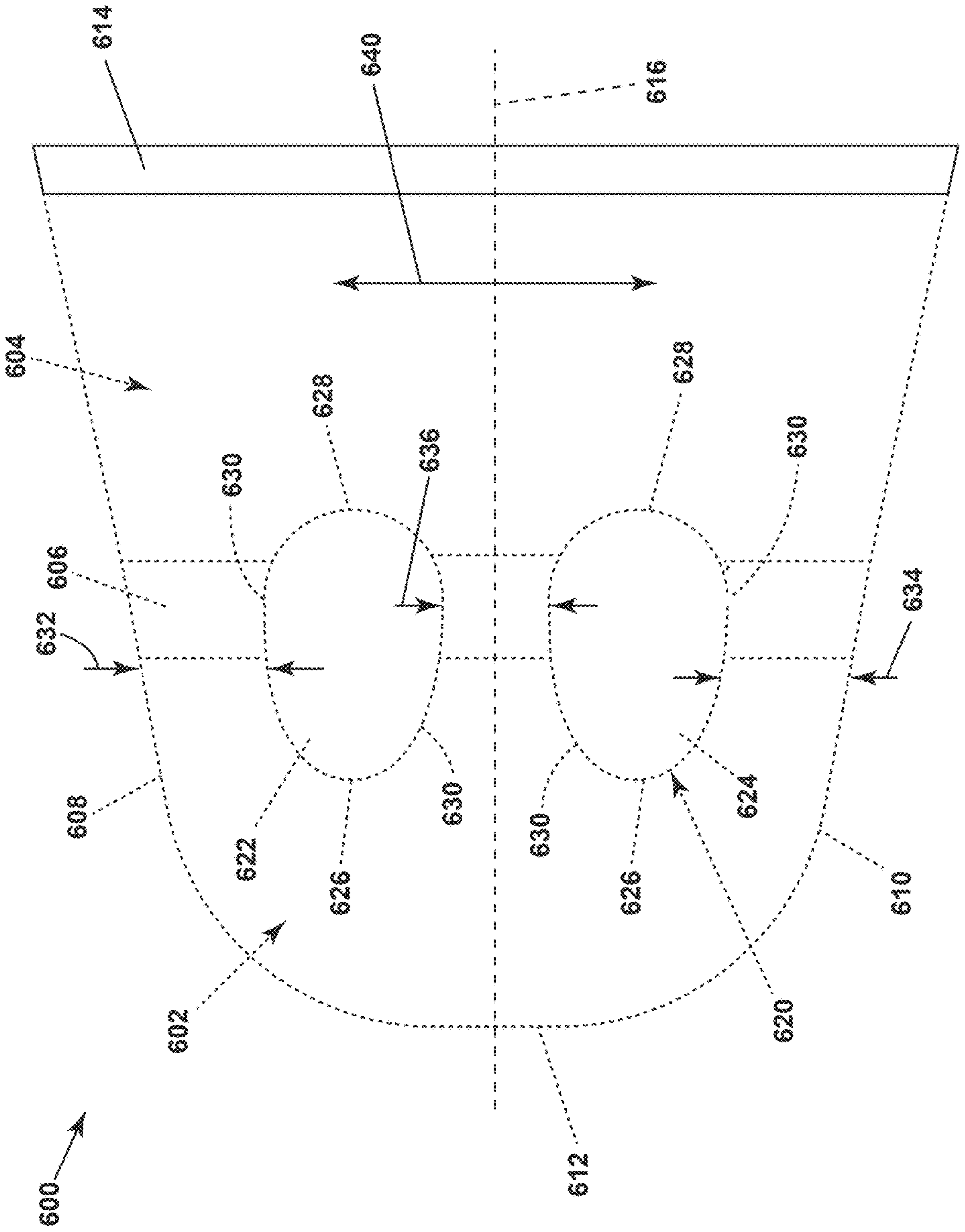

FIG. 12D illustrates a cooling aperture 600 including an impingement portion 602 transitioning to a diffusion portion 604 at a bend 606 having a non-zero length. A first side 608 connects to a second side 610 at a rear side 612 opposite of a diffuser outlet 614. A longitudinal axis 616 can be defined extending between the rear side 612 and the diffuser outlet 614 equidistant between the first side 610 and the second side 612.

A set of pins 620 are arranged within the cooling aperture 600 as a first pin 622 and a second pin 624. Each of the first pin 622 and the second pin 624 include an upstream end 626 spaced from a downstream end 628 by opposing sides 630. Each of the first pin 622 and the second pin 624 can have the same shape and size, as defined by the upstream end 626, the downstream end 628, and the opposing sides 630. In an alternate, non-limiting example, each pin of the set of pins 620 can be unique, shaped or sized differently than the other pin, while any suitable shape for any pin is contemplated.

Each of the first pin 622 and the second pin 624 can have a shape that increases in thickness (T) extending from the upstream end 626 toward the downstream end 628. The first and second pins 622, 624 have an increasing thickness (T) that transitions to a decreasing thickness (T) within the bend 606, while it is contemplated that the first and second pins 622, 624 are arranged such a transition is positioned within either of the impingement portion 602 or the diffusion portion 604. The upstream end 626 can include an elliptical curvature extending between the first and second sides 608, 610. It is further contemplated that the upstream end 626 in combination with the opposing sides 630 can define a conic section in a non-limiting example. The downstream end 628 can define an arcuate curve having a constant radius of curvature extending between the opposing sides 630. In a non-limiting example, the arcuate curvature for the downstream end 628 can be less than or equal to 180 degrees (180°).

A first spacing distance 632 can be defined as the minimum distance between the first side 608 and the first pin 622 defined in a first direction 640 extending perpendicular to the longitudinal axis 616. Similarly, a second spacing distance 634 can be defined as the minimum distance between the second side 610 and the second pin 624 extending in the first direction 640. A center spacing distance 636 is defined as the minimum distance between the first pin 622 and the second pin 624 and can be defined in the first direction 640. In a non-limiting example, the first spacing distance 632, the second spacing distance 634, and the center spacing distance 636 can be equal, defining a symmetric arrangement for the set of pins 620 relative to the longitudinal axis 616. In alternative, non-limiting examples, the first spacing distance 632, the second spacing distance 634, or the center spacing distance 636 can be equal or unequal, while any spacing for the first spacing distance 632, the second spacing distance 634, and the center spacing distance 636 is contemplated.

In another non-limiting example, the size and shape for the first and second pins 622, 624 can be the same, having the same sizes and shapes, while having symmetric spacing relative to the longitudinal axis 616. It alternative examples, it is contemplated that the first and second pins 622, 624 can have different sizes or shapes, or both, defining an asymmetric arrangement for the set of pins 620, while any size, spacing, and shape for the first and second pin 622, 624 is contemplated.

Figure 12E:
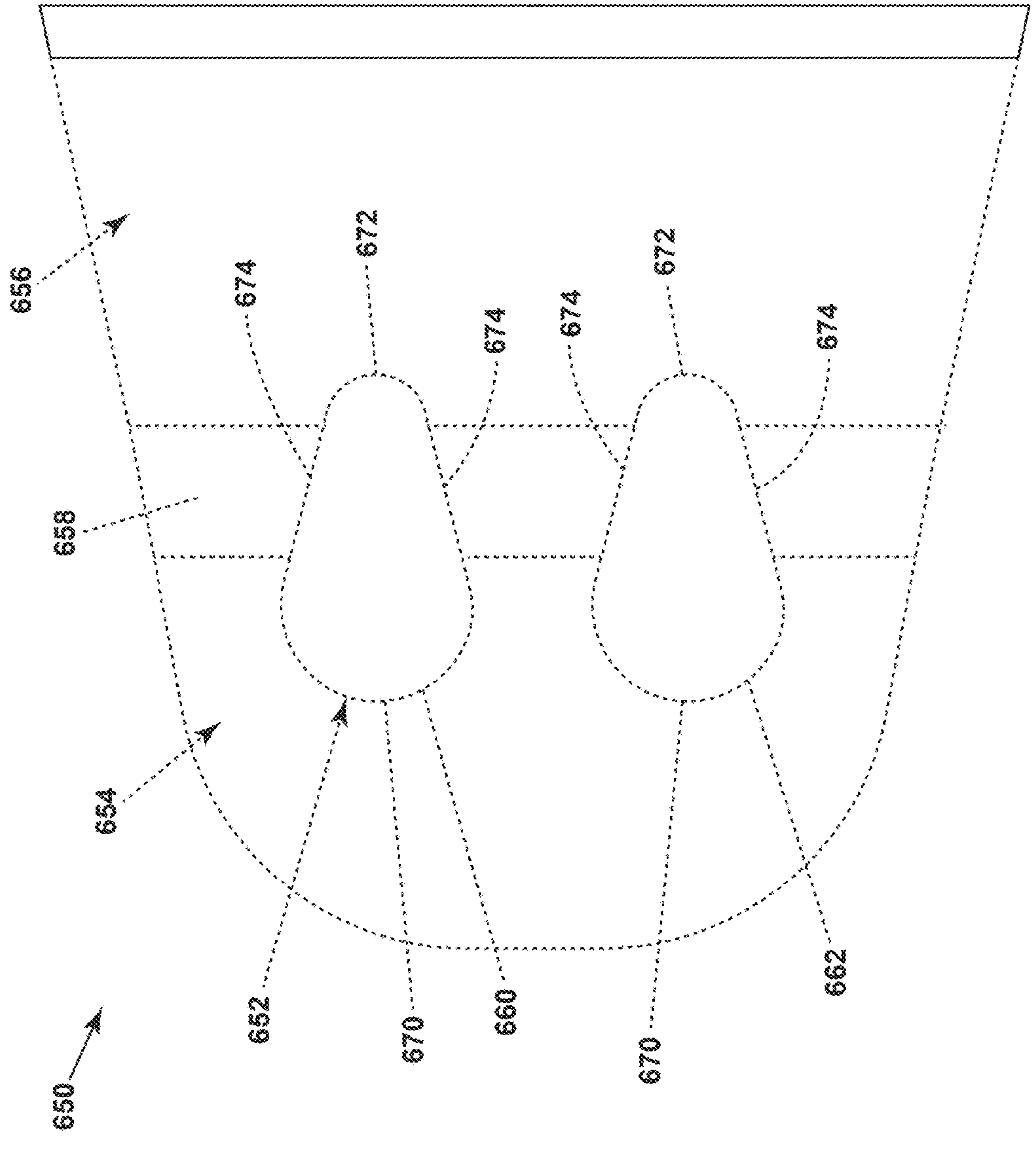

FIG. 12E illustrates a cooling aperture 650 that can be substantially similar to that of the cooling aperture 600 of FIG. 12D, and the discussion will be limited to differences between the two. A set of pins 652 are arranged in the cooling aperture 650 extending between an impingement portion 654 spaced from a diffusion portion 656 by a bend 658. The set of pins 652 is provided as a first pin 660 and a second pin 662, each being similar to one another. Each pin of the set of pins 652 can include an upstream end 670 spacing from a downstream end 672 by opposing pin sides 674. The upstream end 670 and the downstream end 672 can define an arcuate curvature having a common radius of curvature, defining at least a portion of an arc being less than or equal to 180 degrees (180°). The radius for the arcuate curvature at the downstream end 672 has a smaller radius than that of the upstream end 670, such that the downstream end 672 is smaller than the upstream end 670. The pin sides 674 can be linear, extending from the upstream end 670 to the downstream end 672, and defining a decreasing cross-sectional area for each of the first and second pins 660, 662 extending in a direction from the impingement portion 654 to the diffusion portion 656. As the pin sides 674 are linear, the rate at which the cross-sectional area decreases can be constant. The pin sides 674 extend between the impingement portion 654 and the diffusion portion 656, spanning the bend 658. In alternative non-limiting examples, the pin sides 674 need not be linear, but can be curved, defining a variable rate of change for the cross-sectional area between the upstream end 670 and the downstream end 672. In yet another non-limiting example, the bend 658 can have a zero length, wherein the constant rate of change defined by the pin sides 674 is wholly positioned within one of the impingement portion 654 or the diffusion portion 656, or partially positioned within and extending among both the impingement portion 654 and the diffusion portion 656.

Figure 12F:
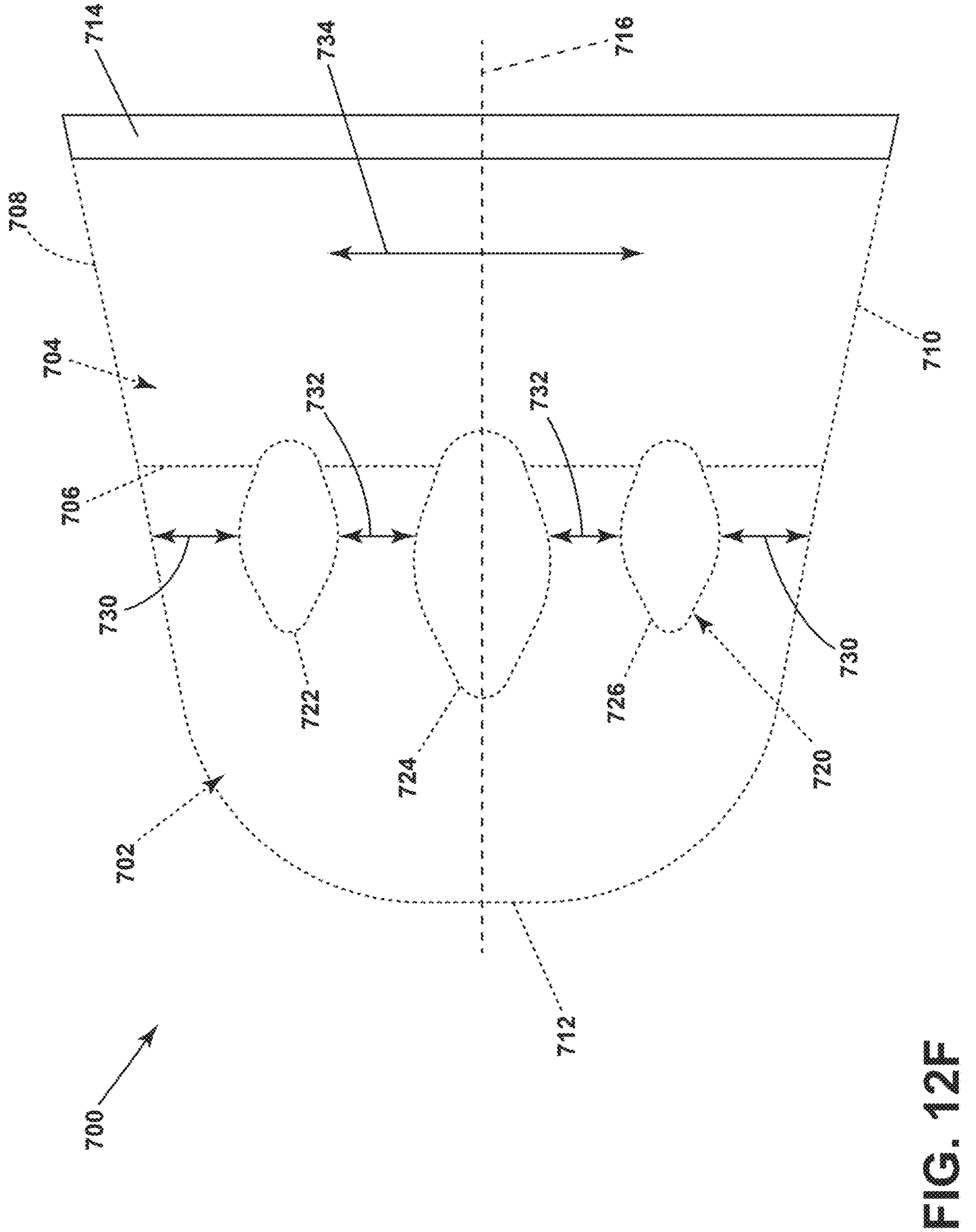

Referring to FIG. 12F, a cooling aperture 700 includes an impingement portion 702 transitioning to a diffusion portion 704 at a bend 706. The cooling aperture 700 includes a first side 708 and a second side 710 meeting at a rear side 712 opposite of a diffuser outlet 714. A longitudinal axis 716 extends between the rear side 712 and the diffuser outlet 714 equidistance between the first side 708 and the second side 710.

A set of pins 720 are provided within the cooling aperture 700 as a first pin 722, a second pin 724, and a third pin 726. The first pin 722 and third pin 726 can have the same size and shape, and can be spaced from the nearest of the first and second sides 708, 710 by a first spacing distance 730. The first spacing distance 730 can be defined in a first direction 734, which can be perpendicular to the longitudinal axis 716, for example. It is contemplated that the first spacing distance 730 can be the same for the first pin 722 at the first side 708 and the third pin 726 at the second side 710, while a non-equal or offset arrangement is contemplated.

The second pin 724 can be positioned between the first pin 722 and the third pin 726, being spaced by a second spacing distance 732 from each of the first pin 722 and the third pin 726 defined in the first direction 734. The second spacing distance 732 can be equal among between the second pin 724 and the first pin 722, and between the second pin 724 and the third pin 726. Where the first spacing distance 730 is the same for both the first pin 722 and the third pin 726, and the second spacing distance 732 is the same on both sides of the second pin 724, a symmetric arrangement can result for the set of pins 720. In an alternate example, a non-symmetric arrangement may be achieved by an unalignment among one or more of the set of pins 720 in a direction along the longitudinal axis 716, while still maintaining the equal spacing despite such an unalignment. In additional non-limiting examples, any spacing is contemplated between any of the pins of the set of pins 720, and any of the first and second sides 708, 710, being equal, unequal, aligned, unaligned, symmetric, or asymmetric, or combinations thereof defined among some or subsets of the set of pins 720.

Figure 12G:
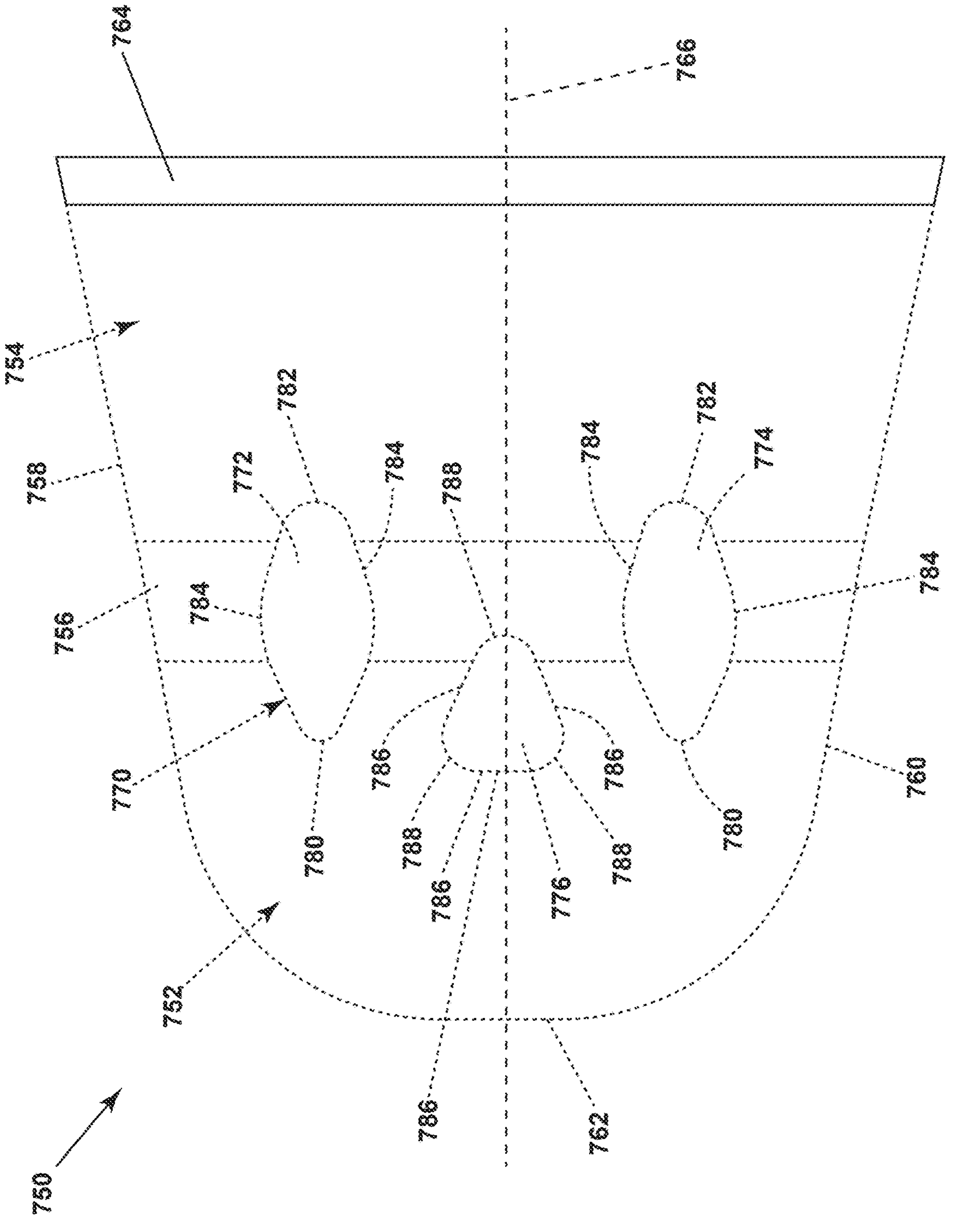

Referring to FIG. 12G, a cooling aperture 750 includes an impingement portion 752 and a diffusion portion 754 meeting at a bend 756 having a non-zero length. A first side 758 is spaced from a second side 760 by a rear side 762 opposite of a diffuser outlet 764. A longitudinal axis 766 is defined extending between the rear side 762 and the diffuser outlet 764 equidistant between the first side 758 and the second side 760.

A set of pins 770 are arranged within the cooling aperture 750 as a first pin 772, a second pin 774, and a third pin 776. The first pin 772 and the second pin 774 can be similar, having the same shape, size, and relative positioning within the cooling aperture 750 to define a symmetric arrangement, while a different size, positioning, shape, or combinations thereof is contemplated. The first and second pins 772, 774 can be symmetrically spaced within the cooling aperture 750, relative to the longitudinal axis 766. The third pin 776 can be sized and shaped differently than the first and second pins 772, 774, and can be aligned along the longitudinal axis 766.

The first and second pins 772, 774 have diamond-like shapes, with an upstream end 780 and a slightly larger downstream end 782. The enlarged downstream end 782 can be defined by a larger radius of curvature than that of the upstream end 780. Sides walls 784 extend between the upstream end 780 and the downstream end 782, transitioning from an increasing cross-sectional area to a decreasing cross-sectional area within the bend 756.

The third pin 776 has a triangular shape, with the three linear side walls 786 spacing three rounded corners 788. The third pin 776 can be aligned along the longitudinal axis 766, for example, and can be symmetric about the longitudinal axis 766. The third pin 776 is positioned upstream of the first and second pins 772, 774, beginning within the impingement portion 752 and terminating within the bend 756 prior to the diffusion portion 754. In alternate arrangements, any upstream, downstream, or aligned positioning of the third pin 776, relative to one or both of the first and second pins 772, 774, the impingement portion 752, the diffusion portion 754, the bend 756, or combinations thereof is contemplated. In additional non-limiting examples, the third pin 776 can begin, extend among, or terminate within any of the impingement portion 752, the bend 756, or the diffusion portion 754. It should be appreciated that any shape or positioning for one or more pins defining the set of pins 770 is contemplated.

Figure 12H:
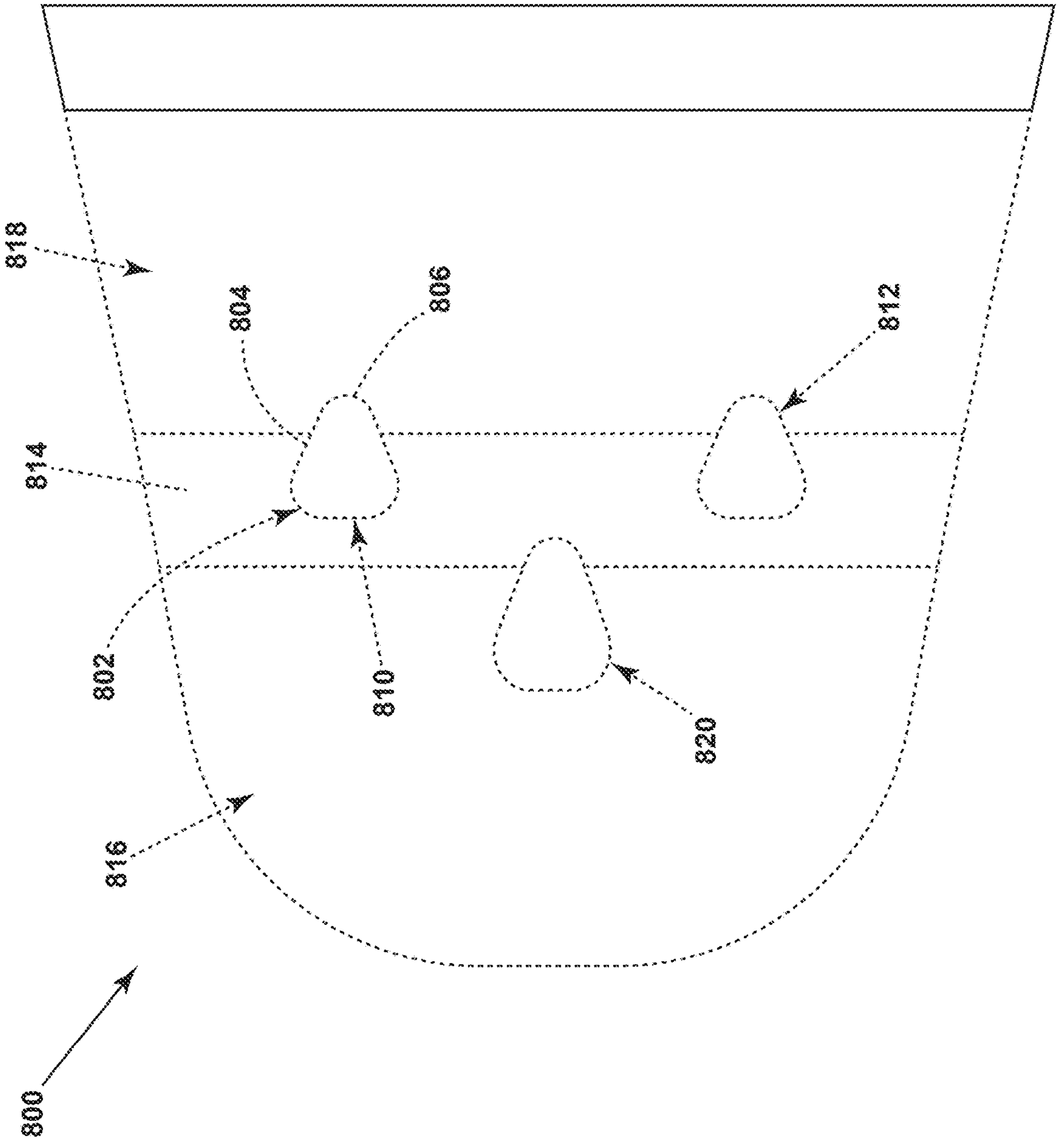

Referring to FIG. 12H, a cooling aperture 800 can be substantially similar to that of FIG. 12G, and the discussion will be limited to the differences between the two. Specifically, the cooling aperture 800 includes a set of pins 802 that each have a rounded triangular shape, similar to the third pin 726 of FIG. 12G. That is, each pin of the set of pins 802 includes three linear sides 804 meeting at three rounded corners 806. A first pin 810 and a second pin 812 can be similarly sized, oriented, and positioned within the cooling aperture 800, with both of the first pin 810 and the second pin 812 beginning within a bend 814 between an impingement portion 816 and a diffusion portion 818, and terminating within the diffusion portion 818. A third pin 820 begins within the impingement portion 816 and terminates within the bend 814. The third pin 820 can have a similar shape as that of the first and second pins 810, 812, while being larger than the first and second pins 810, 812. Additionally, the third pin 820 can be wider or longer than the first and second pins 810, 812, having an elongated or stretched shape as compared to that of the first and second pins 810, 812. It should be appreciated that any shape, size, or positioning for one or more pins of the set of pins 802 is contemplated.

Figure 13:
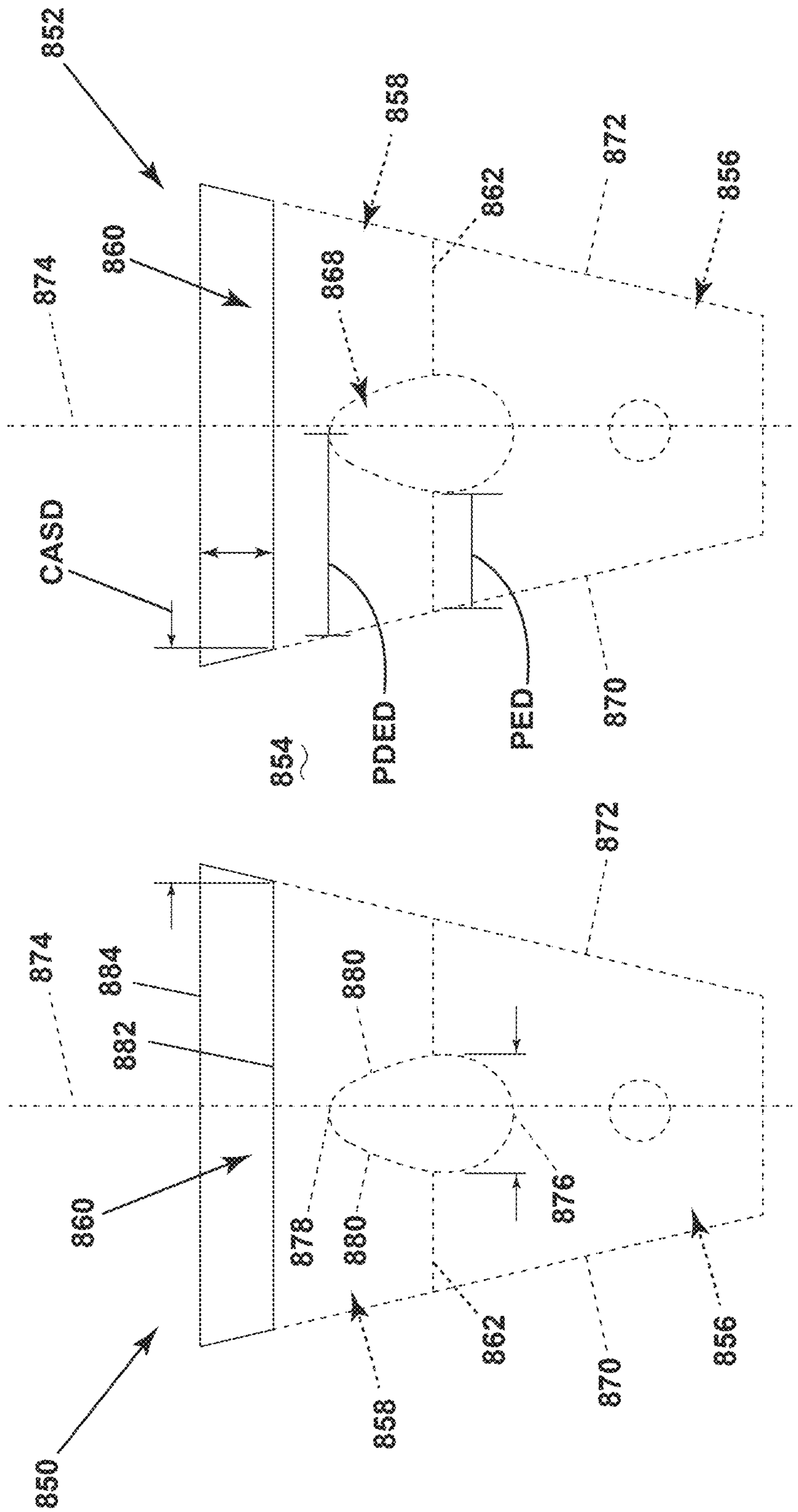
FIG. 13 shows a top view of a first cooling aperture spaced from a second cooling aperture by a cooling aperture spacing distance, in accordance with an aspect of the present disclosure.

Referring to FIG. 13 a first cooling aperture 850 is spaced from a second cooling aperture 852 along an outer wall 854, such as the outer wall 106 (FIG. 2) of the airfoil 104 of FIG. 2. Each of the first cooling aperture 850 and the second cooling aperture 852 includes an impingement portion 856 and a diffusion portion 858 exhausting at a diffuser outlet 860. The impingement portion 856 meets the diffusion portion 858 at a bend 862. Each of the first cooling aperture 850 and the second cooling aperture 852 can extend between a first side 870 and a second side 872. Each of the first cooling aperture 850 and the second cooling aperture 852 includes a pin 868.

A pin edge distance (PED) can be defined as the minimum distance between the pin 868 and the nearest of the first side 870 or the second side 872. In a non-limiting example, the pin edge distance (PED) can be measured perpendicular to a longitudinal axis 874 defined equidistant between the first side 870 and the second side 872. In non-limiting examples, the pin edge distance (PED) can be less than or equal to 0.045 inches (1.143 millimeters) or can be less than or equal to 0.030 inches (0.762 millimeters).

Each pin 868 includes an upstream end 876 and a downstream end 878 with opposing pin sides 880 extending between the upstream end 876 and the downstream end 878. A pin downstream end distance (PDED) can be defined as the distance between the downstream end 878 and the nearest of the first side 870 or the second side 872, and can be measured perpendicular to the longitudinal axis 874. In a non-limiting example, the pin downstream end distance (PDED) can be less than or equal to 0.05 inches (1.27 millimeters). In additional non-limiting examples, the pin downstream end distance (PDED) can be less than or equal to 0.02 inches (0.0508 millimeters) or less than or equal to 0.015 inches (0.381 millimeters).

Each diffuser outlet 860 for the first and second cooling apertures 850, 852 extends between an upstream edge 882 and a downstream edge 884. A cooling aperture spacing distance (CASD) can be defined as the distance between the upstream edge 882 between the adjacent first and second cooling apertures 850, 852. In a non-limiting example, the cooling aperture spacing distance (CASD) can be defined as the minimum distance between the first cooling aperture 850 and the second cooling aperture 852. In another non-limiting example, the cooling aperture spacing distance (CASD) can be defined in a direction perpendicular to the longitudinal axis 874. In a non-limiting example, the cooling aperture spacing distance (CASD) can be less than or equal to 0.25 inches (6.35 millimeters). In additional non-limiting examples, the cooling aperture spacing distance (CASD) can be less than or equal to 0.1 inches (2.54 millimeters) or less than or equal to 0.03 inches (0.762 millimeters).

In a non-limiting example, the pin edge distance (PED) divided by the cooling aperture spacing distance (CASD) can be less than or equal to 3 and greater than or equal to 0.1. In another non-limiting example, the pin edge distance (PED) divided by the cooling aperture spacing distance (CASD) can be less than or equal to 2.5 and greater than or equal to 0.2.

In another non-limiting example, Expression 1 can be defined as follows:

$$\text{Expression 1: (PDED)/((PDED)+(CASD))} \quad (1).$$

In a non-limiting example, Expression 1 can be less than or equal to 0.7. In another non-limiting example, Expression 1 can be less than or equal to 0.6.

Figure 14:
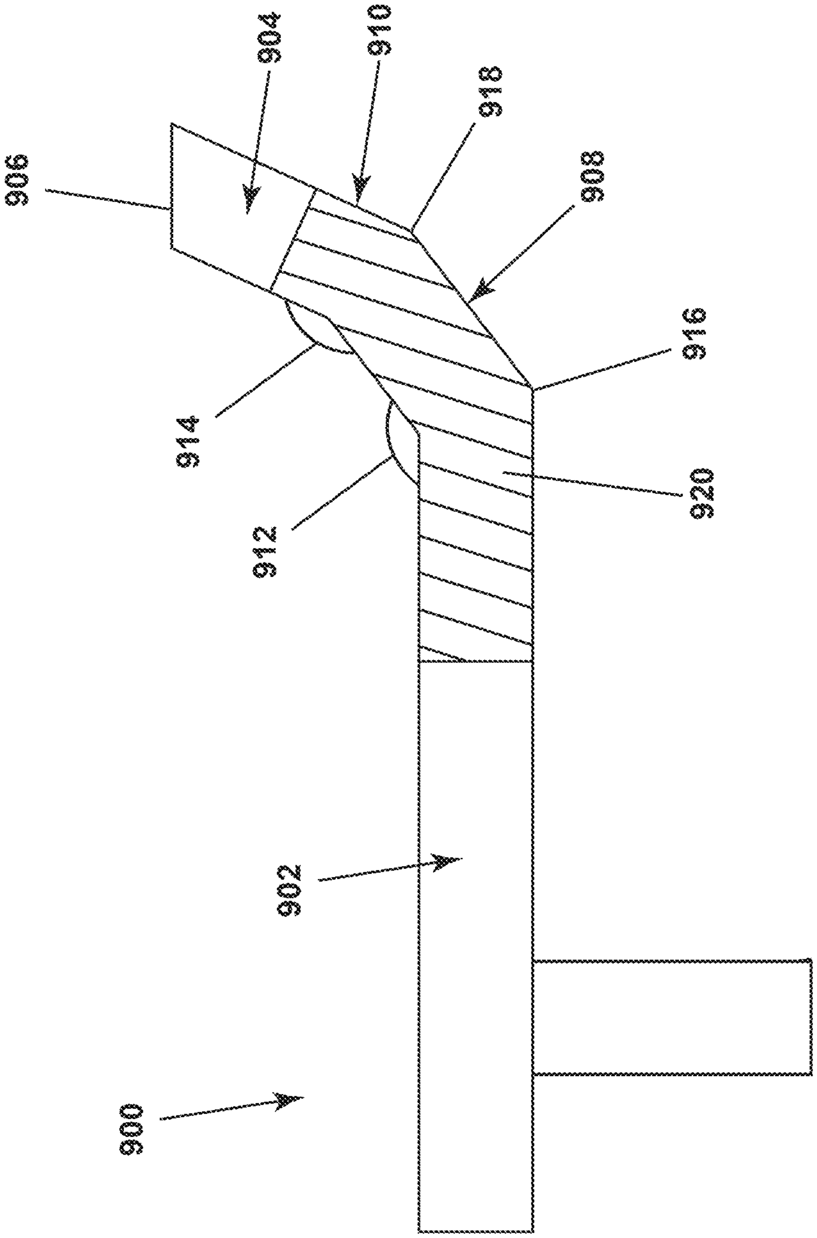
FIG. 14 shows a cross-sectional view of a cooling aperture having an impingement portion arranged at an angle relative to a diffusion portion having an upstream diffusion portion and a downstream diffusion portion, in accordance with an aspect of the present disclosure.

Referring to FIG. 14, a cooling aperture 900 includes an impingement portion 902 and a diffusion portion 904 exhausting at a diffuser outlet 906. The diffusion portion 904 is separable into an upstream diffusion portion 908 and a downstream diffusion portion 910. The upstream diffusion portion 908 can be arranged at a first angle 912 relative to the impingement portion 902, and the downstream diffusion portion 910 can be arranged at a second angle 914 relative to the upstream diffusion portion 908. The first and second angles 912, 914 can be equal or unequal, and can be greater than zero-degrees (0°) and less than 90-degrees (90°), in a non-limiting example. In another non-limiting example, the first angle 912 can be greater than zero-degrees (0°) and less than 90-degrees (90°), while the second angle 914 can be greater than 90-degrees (90°) and less than 180-degrees (180°). A first bend 916 can be defined where the impingement portion 902 meets the diffusion portion 904, and a second bend 918 can be defined where the upstream diffusion portion 908 meets the downstream diffusion portion 910.

In a non-limiting example, the diffusion portion 904 can be separable into multiple diffusion portions, with each portion being arranged at an angle relative to the adjacent portion, similar to how the upstream diffusion portion 908 is arranged at the second angle 914 relative to the downstream diffusion portion 910. In this way, the diffusion portion 904 can be arranged into at least three discrete portions having at least two non-zero angles defined between adjacent portions of the at least three discrete portions.

A pin 920 is positioned within the cooling aperture 850 and extends among the impingement portion 902 and the upstream and downstream diffusion portions 908, 910. In an alternate non-limiting example, the pin 920 can extend only among the impingement portion 902 and the upstream diffusion portion 908, or only among the upstream and downstream diffusion portions 908, 910, or only among the downstream diffusion portion 910.

In another non-limiting example, the pin 920 can be one among a set of multiple pins, where some pins are located among the one or more of the impingement portion 902, the upstream diffusion portion 908, and the downstream diffusion portion 910, and where some pins are located among a different one or more of the impingement portion 902, the upstream diffusion portion 908, and the downstream diffusion portion 910. That is, where the pin 920 is among a set of pins, the individual pins can be arranged within only one of the impingement portion 902, the upstream diffusion portion 908, and the downstream diffusion portion 910, or extending among one or more of the impingement portion 902, the upstream diffusion portion 908, and the downstream diffusion portion 910 in any combination or arrangement.

Benefits associated with the cooling apertures (like cooling apertures 150, 200, 250, 300, 350, 400, 450, 500, 530, 550, 600, 650, 700, 750, 800, 850, 900 described herein) and the pins (like pins 170, 230, 330, 380, 390, 392, 420, 422, 424, 472, 474, 476, 478, 480, 484, 486, 490, 492, 494, 502, 532, 552, 622, 624, 660, 662, 722, 724, 726, 772, 774, 776, 810, 812, 820, 868, 920 or the sets of pins 270, 470, 482, 620, 652, 720, 770, 802 described herein) provides for mechanical benefits that include a decrease in susceptibility to mechanical stress. More specifically, as the width and size for the cooling aperture increases, (like between the first and second sides 160, 162, 216, 218, 260, 262, 310, 312, 360, 362, 410, 412, 460, 462, 512, 514, 570, 572, 608, 610, 708, 710, 758, 760 described herein), susceptibility to compressive stresses increases as the distance from the opposing sides increases. Such compressive stresses can be greatest at the diffusion portion (such as the diffusion portion 156, 206, 256, 306, 356, 406, 456, 508, 542, 604, 656, 704, 754, 818, 858, 904, 908, 910) due to the relatively larger width as compared with the impingement portion (such as the impingement portion 154, 204, 254, 304, 354, 404, 454, 504, 536, 602, 654, 702, 752, 816, 856, 902). More specifically, the pins positioned within the diffusion portion improve stiffness at the diffusion portion, as the pin reduces and mitigates compressive and mechanical stresses across the width of the cooling aperture. The pins described herein mitigate such stresses by providing a mechanical support and increased stiffness within the cooling aperture, and particularly at the diffusion portion, passing the load through the cooling aperture via the pins. The pins provided in the diffusion portion mitigate a greater amount of the compressive stress, while positioning of the pins within, among or across any combination of the impingement portion, the diffusion portion, and the bend (such as the bend 146, 266, 372, 416, 466, 506, 538, 558, 606, 658, 706, 756, 814, 862, 916, 918 as described herein). Furthermore, the pins provide a path for thermal conduction to an outer wall or exterior surface (such as the outer wall 106 or the exterior surface 128 as described at FIG. 2), which can improve local heat transfer, as compared to that without a pin, lacking such a path for thermal conduction. The pin as described herein further provides for locally increased and improved stiffness for the cooling aperture, and provides increased and improved resistant to compressive stress along the cooling aperture or upstream of a diffuser outlet (like the diffuser outlet 158, 208, 258, 308, 358, 408, 458, 510, 614, 714, 764, 860, 906 described herein), which can mitigate operational stresses or aeromechanical stresses acting upon the component or the cooling aperture during use or operation.

The pins as described provide increased strength, stiffness, and resilience for the cooling aperture including an impingement portion and a diffusion portion, which include a bend having a zero or non-zero length. The angled orientation between the impingement portion and the diffusion portion, as well as any bend therebetween, can be susceptible to high engine stresses during operation due to the angled arrangement therebetween. The pins mitigate stresses among the impingement, diffusion, and bend portions.

It should be appreciated that the different cooling apertures described herein can all be utilized within a common engine, such as the gas turbine engine 10 of FIG. 1, or within a common component, such as the airfoil 104 of FIG. 2, and it should be understood that the cooling apertures are not mutually exclusive.

The particular shape, size, and geometry of the cooling aperture, and the pins provided therein, can be tailored to particular needs of the component carrying the cooling aperture. For example, an asymmetry, either among the cooling aperture, the pin(s), or both, can be utilized to increase local stiffnesses to compensate for areas of the cooling aperture of component having locally increased stresses. Similarly, an asymmetry for the pins can be utilized to compensate for local increases or decreases in stresses within the system.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An airfoil for a gas turbine engine, the airfoil comprising: an outer wall defining an interior, the outer wall comprising: an exterior surface; a cooling aperture defining a cavity fluidly coupled to the interior, the cooling aperture comprising: an impingement portion; a diffusion portion oriented at an angle relative to the impingement portion at a bend defined in the cavity; and at least one pin positioned at least partially within the diffusion portion.

The airfoil of any preceding clause, wherein the diffusion portion exhausts at a diffuser outlet extending between an upstream edge and a downstream edge, and wherein the diffusion portion defines a slot height as a length of the upstream edge.

The airfoil of any preceding clause, further comprises a metering hole fluidly coupled to the cooling aperture at the impingement portion, with the metering hole defining a hydraulic diameter.

The airfoil of any preceding clause, wherein a diffuser aspect ratio is defined as the hydraulic diameter divided by the slot height, and wherein the diffuser aspect ratio is greater than or equal to 2 and less than or equal to 25.

The airfoil of any preceding clause, wherein the cooling aperture further comprises a first side spaced from a second side and defines a longitudinal axis equidistant between the first side and the second side.

The airfoil of any preceding clause, wherein the at least one pin defines a pin height as a length of the at least one pin extending between the first side and the second side, defined perpendicular to the longitudinal axis, and wherein the pin height divided by the slot height is greater than or equal to 0.1 and less than or equal to 0.8.

The airfoil of any preceding clause, wherein the at least one pin is spaced from the upstream edge by a pin outlet spacing distance, wherein a bend to outlet distance is defined as a distance between the bend and the upstream edge of the diffuser outlet, and wherein the pin outlet spacing distance divided by the bend to outlet distance is less than or equal to 0.6.

The airfoil of any preceding clause, wherein the at least one pin comprises three pins or less.

The airfoil of any preceding clause, wherein the at least one pin defines a first pin portion length as a length of the at least one pin within the impingement portion, wherein the at least one pin defines a second pin portion length as a length of the at least one pin within the diffusion portion, and wherein a pin length is defined as a summation of the first pin portion length and the second pin portion length.

The airfoil of any preceding clause, wherein the second pin portion length is greater than or equal to 0.015 inches (0.381 millimeters).

The airfoil of any preceding clause, wherein the second pin portion length divided by the pin length is greater than or equal to 0.10.

The airfoil of any preceding clause, wherein the at least one pin is positioned fully within the diffusion portion.

The airfoil of any preceding clause, wherein the at least one pin comprises multiple pins, and wherein at least 25% of the multiple pins have portion within the diffusion portion.

An airfoil for a gas turbine engine, the airfoil comprising: an outer wall defining an interior: a first cooling aperture provided in the outer wall and fluidly coupled to the interior; a second cooling aperture spaced from the first cooling aperture, provided in the outer wall, and fluidly coupled to the interior: wherein each of the first cooling aperture and the second cooling aperture comprises: a first side; a second side spaced from the first side; an impingement portion; a cavity defining a bend; a diffusion portion oriented at an angle relative to the impingement portion at the bend, the diffusion portion exhausting at a diffuser outlet defined between an upstream edge and a downstream edge; and at least one pin positioned at least partially within the diffusion portion, the at least one pin having an upstream end, a downstream end, and opposing pin sides.

The airfoil of any preceding clause, wherein a pin edge distance is defined as a distance between the downstream end of the at least one pin and the nearest of the first side or the second side for each of the first cooling aperture and the second cooling aperture; wherein a cooling aperture spacing distance is defined as a distance between the upstream edge of the diffuser outlet of the first cooling aperture and the upstream edge of the diffuser outlet of the second cooling aperture; and wherein the pin edge distance divided by the cooling aperture spacing distance is less than or equal to 3 and greater than or equal to 0.1.

The airfoil of any preceding clause, wherein a pin downstream edge distance is defined as the distance between the downstream end of the at least one pin and the nearest of the first side or the second side for each of the first cooling aperture and the second cooling aperture; and wherein the pin downstream end distance divided by a summation of the pin downstream edge distance and the cooling aperture spacing distance is less than or equal to 0.7.

The airfoil of any preceding clause, wherein the at least one pin extends across the bend and is at least partially positioned within both of the impingement portion and the diffusion portion.

The airfoil of any preceding clause, wherein the at least one pin divides the diffuser outlet into a first outlet portion and a second outlet portion.

The airfoil of any preceding clause, wherein the at least one pin comprises multiple pins, and wherein a first pin of the multiple pins is a different size or a different shape than a second pin of the multiple pins.

The airfoil of any preceding clause, wherein the at least one pin includes a cross-sectional shape that is egg-shaped, oval, pyriform, pear-shaped, airfoil-shaped, or diamond-shaped.

An airfoil for a gas turbine engine, the airfoil comprising: an outer wall defining an interior, the outer wall comprising: an exterior surface; a cooling aperture fluidly coupled to the interior, the cooling aperture comprising: a cavity; an upper surface spaced from a lower surface; an impingement portion; a diffusion portion; a bend orienting the diffusion portion at an angle relative to the impingement portion; a first side spaced from a second side by a rear side, with the first side and the second side spanning the impingement portion and the diffusion portion, and wherein a longitudinal axis is defined equidistant between the first side and the second side; and a diffuser outlet extending between the first side and the second side and exhausting from the cavity opposite of the rear side; and at least one pin positioned within the cavity extending between the upper surface and the lower surface, and wherein the at least one pin positions at least partially within at least one of the bend or the diffusion portion.

The airfoil of any preceding clause, wherein the diffuser outlet extends between an upstream edge and a downstream edge, wherein the diffuser outlet defines an outlet thickness as the distance between the upstream edge and the downstream edge defined in a direction along the longitudinal axis, wherein a width for the for the cooling aperture at the diffuser outlet is defined as the distance between the first side and the second side at the diffuser outlet and defined equidistant between the upstream edge and the downstream edge; and wherein an aspect ratio for the cooling aperture can be defined as the ratio of the width at the diffuser outlet to the outlet thickness, and wherein the aspect ratio can be greater than zero and less than or equal to 200.

The airfoil of any preceding clause, wherein the aspect ratio can be greater than zero and less than or equal to 50.

The airfoil of any preceding clause, wherein the aspect ratio can be greater than 2 and less than or equal to 20.

The airfoil of any preceding clause, wherein the impingement portion is non-coplanar with the diffusion portion.

The airfoil of any preceding clause, wherein the at least one pin extends within both the impingement portion and the diffusion portion.

The airfoil of any preceding clause, wherein the bend has a non-zero length defined in a direction extending from the rear side to the diffuser outlet.

The airfoil of any preceding clause, wherein the at least one pin extends from the impingement portion to the diffusion portion across the bend.

The airfoil of any preceding clause, wherein the at least one pin extends from the impingement portion to the bend.

The airfoil of any preceding clause, wherein the at least one pin extends from the bend to the diffusion portion.

The airfoil of any preceding clause, further comprising a cooling circuit and a metering hole fluidly coupling the cooling aperture to the cooling circuit.

The airfoil of any preceding clause, wherein the metering hole is non-perpendicular to the upper surface.

The airfoil of any preceding clause, wherein the angle between the impingement portion and the diffusion portion is greater than 90-degrees (90°) and less than 180-degrees (180°).

The airfoil of any preceding clause, further comprising a longitudinal axis defined equidistant between the first side and the second side.

The airfoil of any preceding clause, wherein the pin is asymmetric about the longitudinal axis.

The airfoil of any preceding clause, wherein at least one of the first side or the second side is arranged at a side angle relative to a parallel axis arranged parallel to the longitudinal axis.

The airfoil of any preceding clause, wherein the side angle is greater than three-degrees (3°).

The airfoil of any preceding clause, wherein the at least one pin further comprises an increasing cross-sectional area within the impingement portion defined in a direction extending toward the diffuser outlet.

The airfoil of any preceding clause, wherein the at least one pin further comprises a decreasing cross-sectional area within the diffusion portion defined in a direction extending toward the diffuser outlet.

The airfoil of any preceding clause, wherein the at least one pin transitions from the increasing cross-sectional area to the decreasing cross-sectional area at the bend.

The airfoil of any preceding clause, wherein the at least one pin terminates at a downstream end at the diffuser outlet.

The airfoil of any preceding clause, wherein the diffuser outlet further comprises an upstream edge and a downstream edge, and wherein the downstream end of the at least one pin is positioned equidistant from the upstream edge and the downstream edge.

The airfoil of any preceding clause, wherein the at least one pin divides the diffuser outlet into a first portion and a second portion.

The airfoil of any preceding clause, wherein the at least one pin is flush with the outer wall at the diffuser outlet.

The airfoil of any preceding clause, wherein the at least one pin comprises at least two pins, with each pin terminating at the diffuser outlet and dividing the diffuser outlet into at least a first portion, a second portion, and a third portion.

The airfoil of any preceding clause, wherein the at least one pin further comprises a set of at least two pins.

The airfoil of any preceding clause, wherein at least one pin of the set of at least two pins is positioned upstream of another pin of the set of at least two pins defined in a direction extending between the rear side and the diffuser outlet.

The airfoil of any preceding clause, wherein at least one pin of the set of at least two pins is smaller than another pin of the set of at least two pins.

The airfoil of any preceding clause, wherein each pin of the set of at least two pins includes the same shape.

The airfoil of any preceding clause, wherein at least one pin of the set of at least two pins extends among the impingement portion and the diffusion portion.

The airfoil of any preceding clause, wherein at least one pin of the set of at least two pins is positioned only within one of the impingement portion or the diffusion portion.

The airfoil of any preceding clause, wherein the at least one pin includes a cross-sectional shape that is egg-shaped, oval, pyriform, pear-shaped, airfoil-shaped, diamond-shaped, circular, linear, curved, square, rectangular, angled, curvilinear, elliptical, or combinations thereof.

The airfoil of any preceding clause, wherein the diffusion portion further comprises an upstream diffusion portion and a downstream diffusion portion offset from the upstream diffusion portion by a second angle.

The airfoil of any preceding clause, wherein the second angle is greater than 50-degrees (50°).

The airfoil of any preceding clause, wherein the diffusion portion further comprises at least three discrete portions with each portion being of the at least three discrete portions arranged at an angle relative to adjacent portions of the at least three discrete portions.

The airfoil of any preceding clause, wherein the diffusion portion curves toward the exterior surface.

The airfoil of any preceding clause, wherein the diffusion portion is non-planar with the impingement portion.

The airfoil of any preceding clause, wherein the pin defines a pin height extending between the upper surface and the lower surface.

The airfoil of any preceding clause, wherein the pin height is defined perpendicular to at least one of the upper surface or the lower surface.

The airfoil of any preceding clause, further comprising a wall height defined as a thickness for the outer wall defined between the upper surface and the exterior surface in a direction perpendicular to the upper surface.

The airfoil of any preceding clause, wherein a ratio of the pin height to the wall height is greater than or equal to 0.10 and less than or equal to 0.80.

The airfoil of any preceding clause, wherein the at least one pin defines a pin cross-sectional area, wherein the diffuser outlet defines a diffuser outlet cross-sectional area, and wherein a ratio of the pin cross-sectional area to the diffuser outlet cross-sectional area is greater than or equal to 0.2 and less than or equal to 4.0.

The airfoil of any preceding clause, wherein the ratio of the pin cross-sectional area to the diffuser outlet cross-sectional area is 1.0.

The airfoil of any preceding clause, wherein at least 10% of the pin cross-sectional area is positioned within the diffusion portion.

The airfoil of any preceding clause, wherein the at least one pin comprises multiple pins.

The airfoil of any preceding clause, wherein at least 25% of the pins among the multiple pins have at least a portion positioned within the diffusion portion.

The airfoil of any preceding clause, wherein at least 25% of the pin is arranged within the diffusion portion.

The airfoil of any preceding clause, wherein at least 25% of the pin is arranged among the diffusion portion and the bend.

The airfoil of any preceding clause, wherein each pin among the multiple pins is spaced from a nearest pin of the multiple pins by at least 0.01 inches (0.254 mm).

The airfoil of any preceding clause, wherein the multiple pins define a pin density within the cooling aperture, and wherein the pin density increases or decreases in a direction toward the diffuser outlet.

The airfoil of any preceding clause, wherein the increase or decrease in pin density is defined by a change in the number, the size, the shape, or the cross-sectional area of the multiple pins.

The airfoil of any preceding clause, wherein the at least one pin is arranged perpendicular to the upper surface and the lower surface.

The airfoil of any preceding clause, wherein the at least one pin is arranged offset from perpendicular to at least one of the upper surface or the lower surface.

The airfoil of any preceding clause, wherein the at least one pin is arranged offset from perpendicular to both of the upper surface and the lower surface.

The airfoil of any preceding clause, wherein the at least one pin further comprises an upstream end and a downstream end.

The airfoil of any preceding clause, wherein the upstream end is positioned within 0.75 inches (1.905 mm) of the bend.

The airfoil of any preceding clause, wherein the downstream end is positioned within 0.025 inches (0.635 mm) of the diffuser outlet.

The airfoil of any preceding clause, wherein the downstream end is positioned within 0.015 inches (0.381 mm) of the diffuser outlet.

The airfoil of any preceding clause, wherein the airfoil is formed via a casting process about a ceramic core at least partially defining the cooling aperture.

The airfoil of any preceding clause, wherein the airfoil is formed via a casting process about a refractory metal core at least partially defining the cooling aperture.

The airfoil of any preceding clause, wherein the at least one pin includes a variable density.

A component for a turbine engine, the component comprising: a cooling aperture comprising: a cavity extending between a first end and a second end; an upper surface spaced from a lower surface; a first side spaced from a second side; an upstream portion; a downstream portion; a bend orienting the upstream portion at an angle relative to the downstream portion; a rear side extending between the first side and the second side at the first end at the upstream portion; a diffuser outlet extending between the first side and the second side at the second end at the downstream portion; a pin positioned at least partially positioned within the downstream portion.

The cooling aperture of any preceding clause, further comprising a rear side spacing the first side from the second side opposite of the diffuser outlet.

The cooling aperture of any preceding clause, wherein the impingement portion and the diffusion portion include an upper surface spaced from a lower surface, with the pin extending between the upper surface and the lower surface.

The cooling aperture of any preceding clause, wherein the bend has a non-zero length defining a volume between the impingement portion and the diffusion portion.

The cooling aperture of any preceding clause, wherein the pin extends from the impingement portion to the diffusion portion across the bend.

The cooling aperture of any preceding clause, wherein the angle between the impingement portion and the diffusion portion is greater than 90-degrees (90°) and less than 180-degrees (180°).

The cooling aperture of any preceding clause, wherein the pin further comprises an increasing cross-sectional area within the impingement portion defined in a direction extending toward the diffuser outlet.

The cooling aperture of any preceding clause, wherein the pin further comprises a deceasing cross-sectional area within the diffusion portion in a direction extending toward the diffuser outlet.

The cooling aperture of any preceding clause, wherein the pin transitions from the increasing cross-sectional area to the decreasing cross-sectional area at the bend.

The cooling aperture of any preceding clause, wherein the pin terminates at a downstream end at the diffuser outlet.

The cooling aperture of any preceding clause, wherein the diffuser outlet further comprises an upstream edge and a downstream edge, and wherein the downstream end of the pin is positioned equidistant from the upstream edge and the downstream edge.

The cooling aperture of any preceding clause, wherein the pin divides the diffuser outlet into a first portion and a second portion.

The cooling aperture of any preceding clause, wherein the pin is flush with the diffuser outlet.

The cooling aperture of any preceding clause, wherein the pin is one of a set of at least two pins.

The cooling aperture of any preceding clause, wherein at least one pin of the set of at least two pins is positioned upstream of another pin of the set of at least two pins defined in a direction extending toward the diffuser outlet.

The cooling aperture of any preceding clause, wherein at least one pin of the set of at least two pins is smaller than another pin of the set of at least two pins.

The cooling aperture of any preceding clause, wherein each pin of the set of at least two pins includes the same shape.

The cooling aperture of any preceding clause, wherein at least one pin of the set of at least two pins is positioned only within one of the impingement portion or the diffusion portion.

The cooling aperture of any preceding clause, wherein the pin includes a cross-sectional shape that is egg-shaped, oval, pyriform, pear-shaped, airfoil-shaped, diamond-shaped, circular, linear, curved, square, rectangular, angled, curvilinear, elliptical, or combinations thereof.

The cooling aperture of any preceding clause, wherein the pin is positioned within the bend.

What is claimed is:

1. An airfoil for a gas turbine engine, the airfoil comprising:

an outer wall defining an interior:

a first cooling aperture provided in the outer wall and fluidly coupled to the interior;

a second cooling aperture spaced from the first cooling aperture, provided in the outer wall, and fluidly coupled to the interior:

wherein each of the first cooling aperture and the second cooling aperture comprises:

a first side;

a second side spaced from the first side;

an impingement portion;

a cavity defining a bend;

a diffusion portion oriented at an angle relative to the impingement portion at the bend, the diffusion portion exhausting at a diffuser outlet defined between an upstream edge and a downstream edge; and at least one pin positioned at least partially within the diffusion portion, the at least one pin having an upstream end, a downstream end, and opposing pin sides, wherein a pin edge distance is defined as a distance between the downstream end of the at least one pin and a nearest of the first side or the second side for each of the first cooling aperture and the second cooling aperture;

wherein a cooling aperture spacing distance is defined as a distance between the upstream edge of the diffuser outlet of the first cooling aperture and the upstream edge of the diffuser outlet of the second cooling aperture; and wherein the pin edge distance divided by the cooling aperture spacing distance is less than or equal to 3 and greater than or equal to 0.1.

2. The airfoil of claim 1, further comprising a metering hole fluidly coupled to the cooling aperture at the impingement portion, with the metering hole defining a hydraulic diameter.

3. The airfoil of claim 2, wherein the diffusion portion defines a slot height as a length of the upstream edge, wherein a diffuser aspect ratio is defined as the hydraulic diameter divided by the slot height, and wherein the diffuser aspect ratio is greater than or equal to 2 and less than or equal to 25.

4. The airfoil of claim 1, wherein a longitudinal axis is defined equidistant between the first side and the second side, wherein the diffusion portion defines a slot height as a length of the upstream edge, wherein the at least one pin defines a pin height as a length of the at least one pin extending between the first side and the second side, defined perpendicular to the longitudinal axis, and wherein the pin height divided by the slot height is greater than or equal to 0.1 and less than or equal to 0.8.

5. The airfoil of claim 1, wherein the at least one pin is spaced from the upstream edge by a pin outlet spacing distance, wherein a bend to outlet distance is defined as a distance between the bend and the upstream edge of the diffuser outlet, and wherein the pin outlet spacing distance divided by the bend to outlet distance is less than or equal to 0.6.

6. The airfoil of claim 1, wherein the at least one pin comprises three or fewer pins.

7. The airfoil of claim 1, wherein the at least one pin defines a first pin portion length as a length of the at least one pin within the impingement portion, wherein the at least one pin defines a second pin portion length as a length of the at least one pin within the diffusion portion, and wherein a pin length is defined as a summation of the first pin portion length and the second pin portion length.

8. The airfoil of claim 7, wherein the second pin portion length is greater than or equal to 0.015 inches (0.381 millimeters).

9. The airfoil of claim 7, wherein the second pin portion length divided by the pin length is greater than or equal to 0.10.

10. The airfoil of claim 1, wherein the at least one pin is positioned fully within the diffusion portion.

11. The airfoil of claim 1, wherein the at least one pin comprises multiple pins, and wherein at least 25% of the multiple pins are positioned at least partially within the diffusion portion.

12. The airfoil of claim 1, wherein a pin downstream edge distance is defined as the distance between the downstream end of the at least one pin and the nearest of the first side or the second side for each of the first cooling aperture and the second cooling aperture; and wherein the pin downstream edge distance divided by a summation of the pin downstream edge distance and the cooling aperture spacing distance is less than or equal to 0.7.

13. The airfoil of claim 1, wherein the at least one pin extends across the bend and is at least partially positioned within both of the impingement portion and the diffusion portion.

14. The airfoil of claim 1, wherein the at least one pin divides the diffuser outlet into a first outlet portion and a second outlet portion.

15. The airfoil of claim 1, wherein the at least one pin comprises multiple pins, and wherein a first pin of the multiple pins is a different size or a different shape than a second pin of the multiple pins.

16. The airfoil of claim 1, wherein the at least one pin includes a cross-sectional shape that is egg-shaped, oval, pyriform, pear-shaped, airfoil-shaped, or diamond-shaped.

* * * * *